(12) United States Patent
Kosseifi et al.

(10) Patent No.: US 10,515,398 B2
(45) Date of Patent: Dec. 24, 2019

(54) SYSTEM, METHOD, AND MEMORY DEVICE FOR PERSONALIZED VACATIONS

(71) Applicant: AT&T Mobility II, LLC, Atlanta, GA (US)

(72) Inventors: Mario Kosseifi, Roswell, GA (US); Joseph Thomas, Marietta, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 465 days.

(21) Appl. No.: 14/620,334

(22) Filed: Feb. 12, 2015

(65) Prior Publication Data
US 2016/0239893 A1 Aug. 18, 2016

(51) Int. Cl.
| | |
|---|---|
| *G06Q 30/00* | (2012.01) |
| *G06Q 30/06* | (2012.01) |
| *H04L 29/06* | (2006.01) |
| *G06Q 50/14* | (2012.01) |
| *G06F 16/335* | (2019.01) |
| *G06F 16/9535* | (2019.01) |
| *H04L 29/08* | (2006.01) |

(52) U.S. Cl.
CPC ....... *G06Q 30/0621* (2013.01); *G06F 16/335* (2019.01); *G06F 16/9535* (2019.01); *G06Q 30/0645* (2013.01); *G06Q 50/14* (2013.01); *H04L 63/08* (2013.01); *H04L 67/306* (2013.01)

(58) Field of Classification Search
CPC ..... G06Q 30/0601–0645; G06Q 50/14; G06Q 40/00; G06F 16/9535; G06F 16/335; H04L 63/08; H04L 67/306

USPC .................. 705/26.1–27.2, 307, 35; 707/784
See application file for complete search history.

(56) References Cited

U.S. PATENT DOCUMENTS

| | | | |
|---|---|---|---|
| 5,990,885 A | 11/1999 | Gopinath | |
| 7,689,446 B2 | 3/2010 | Sagar | |
| 7,752,329 B1 | 7/2010 | Meenan et al. | |
| 8,108,666 B2 | 1/2012 | Baskey et al. | |
| 8,112,295 B1 | 2/2012 | Parker et al. | |
| 8,561,145 B2 | 10/2013 | Lim et al. | |
| 8,566,883 B2 | 10/2013 | Ostlund | |
| 8,578,418 B2 | 11/2013 | Levy et al. | |
| 8,635,154 B2 | 1/2014 | Chen et al. | |
| 8,713,612 B2 | 4/2014 | Levy et al. | |
| 2003/0098789 A1* | 5/2003 | Murakami | ....... G08B 13/19634 340/506 |

(Continued)

OTHER PUBLICATIONS

Meek, Thersea. How Tech Will Make Your Hotel Room Feel Like Home (or Better). Nov. 13, 2014. (Nov. 13, 2014). Samsung Business. (Year: 2014).*

*Primary Examiner* — Jeffrey A. Smith
*Assistant Examiner* — Allison G Wood
(74) *Attorney, Agent, or Firm* — Scott P. Zimmerman, PLLC

(57) ABSTRACT

Personalization of a rental property is automatically performed based on presence or detection of a wireless device. A unique identifier of a wireless cellular device, for example, may be associated to a personalization profile. When the wireless cellular device is detected by a network serving the rental property, the personalization profile may be retrieved. Devices in the rental property may thus be personalized with music, movies, and other information in the personalization profile. Hotel rooms and rental cars may thus be personalized to a user of the wireless cellular device.

20 Claims, 28 Drawing Sheets

(56) References Cited

U.S. PATENT DOCUMENTS

| | | |
|---|---|---|
| 2003/0149576 A1 | 8/2003 | Sunyich |
| 2005/0198040 A1 | 9/2005 | Cohen et al. |
| 2005/0246738 A1* | 11/2005 | Lockett ................ H04N 5/4403 |
| | | 725/43 |
| 2005/0278735 A1 | 12/2005 | Boothe |
| 2006/0218244 A1 | 9/2006 | Rasmussen et al. |
| 2006/0254862 A1* | 11/2006 | Hoersten .......... G06Q 10/06311 |
| | | 186/52 |
| 2008/0155429 A1* | 6/2008 | Frank ................ H04L 12/2829 |
| | | 715/751 |
| 2010/0185470 A1 | 7/2010 | Sagar |
| 2010/0191551 A1 | 7/2010 | Drance et al. |
| 2013/0024884 A1 | 1/2013 | Agnihotri et al. |
| 2013/0074106 A1 | 3/2013 | Hayashi et al. |
| 2013/0305341 A1* | 11/2013 | Baker ................ H04L 41/0809 |
| | | 726/11 |
| 2017/0172340 A1* | 6/2017 | Baarman ................ A47J 31/52 |

* cited by examiner

SYSTEM, METHOD, AND MEMORY DEVICE FOR PERSONALIZED VACATIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Transient rental properties are impersonal. Vacation rentals and hotel rooms lack many comforts of home, such as our favorite pictures, music, and movies. Rental cars also lack our favorite radio stations, seating positions, and other settings.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
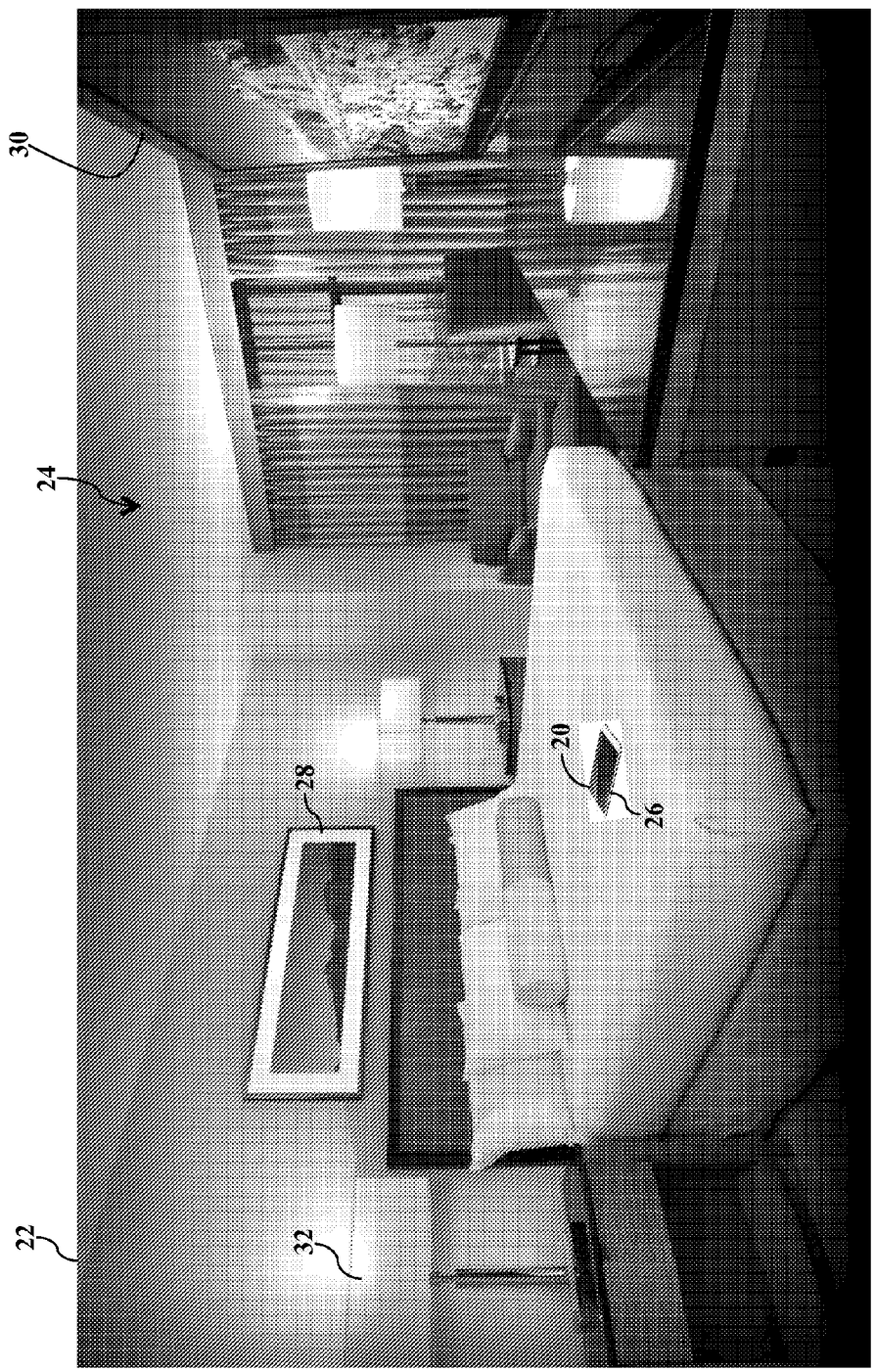
FIGS. 1-3 are simplified schematics illustrating an environment in which exemplary embodiments may be implemented.
Figure 2:
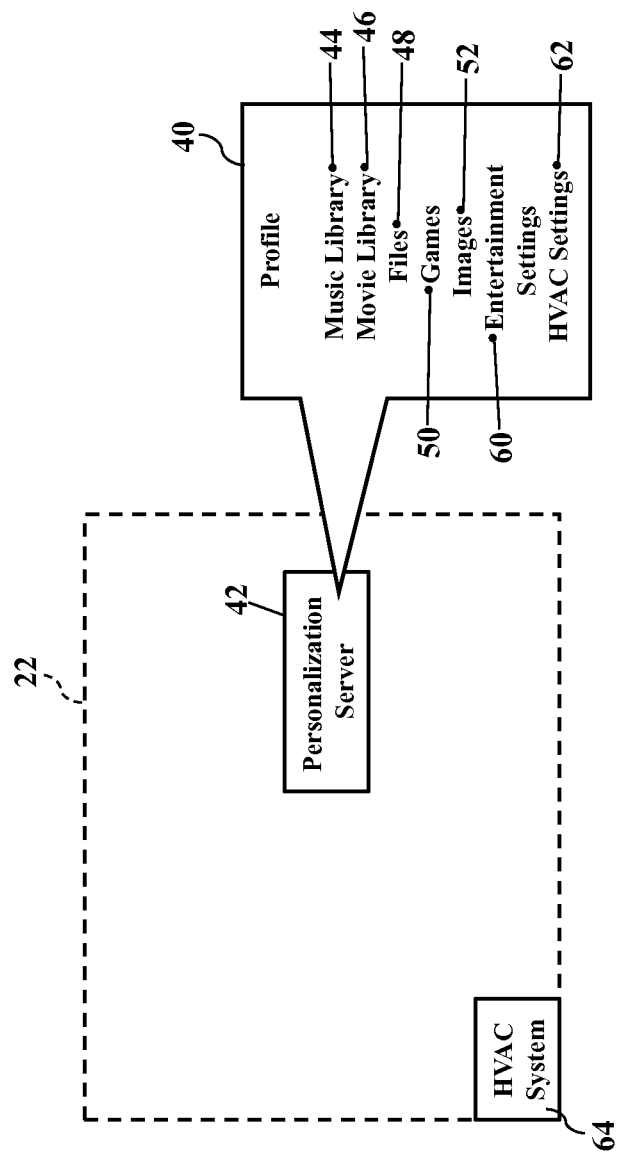
Figure 3:
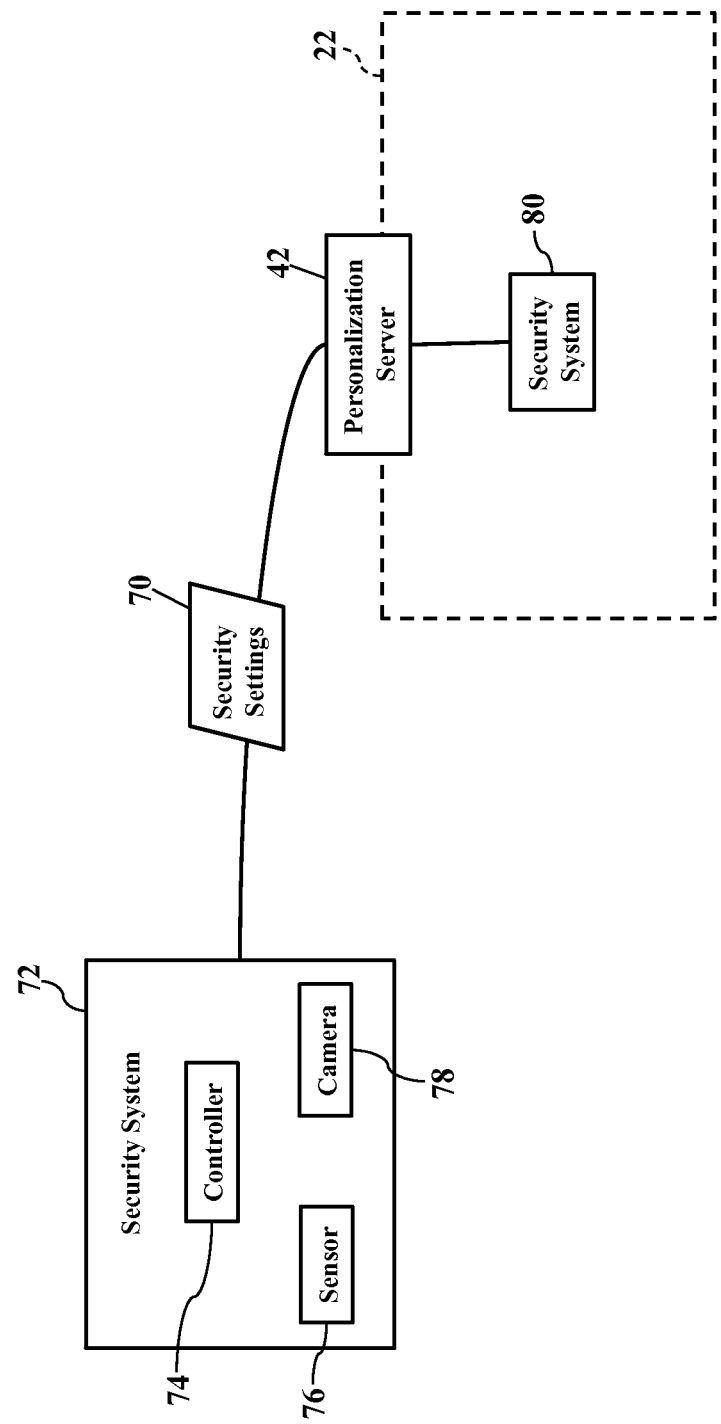

FIGS. 1-3 are simplified schematics illustrating an environment in which exemplary embodiments may be implemented. FIG. 1 illustrates a wireless device 20 in a rental property 22, such as hotel room 24. The wireless device 20 is illustrated as a smartphone 26, which is slightly enlarged for clarity. As the reader understands, many guests may carry their smartphone 26 during a rental stay in the hotel room 24. The wireless device 20, however, may be any processor-controlled device, as later paragraphs will explain. Whatever the wireless device 20, exemplary embodiments personalize the rental property 22, based on the location or detection of the renter's wireless device 20. That is, once the smartphone 26 is detected, the hotel room 24 may be configured to the preferences of a user of the smartphone 26. An electronic picture display 28, for example, may download and display the user's personal digital pictures of family and friends. A television 30 or other display may adapt to the user's favorite channels. A lighting fixture 32 may output the user's preferred lighting levels. Indeed, exemplary embodiments may tailor music, heating, air conditioning, and any other system or component, as later paragraphs will explain. The hotel room 24, in simple words, is personalized to suit the renter, thus making the hotel room 24 more like home.

FIG. 2 illustrates the personalization. When a user wishes to personalized rental properties, the user establishes a profile 40. The profile 40 stores or describes information that may be used to personalize devices, environments, vehicles, and properties. FIG. 2 illustrates the profile 40 stored and maintained in a personalization server 42. The profile 40, though, may be generated and/or stored by any device, as later paragraphs will explain. Regardless, the profile 40 describes parameters, settings, rules, habits, and configurations for the user's digital devices and life. The profile 40, for example, may contain or describe the user's music library 44. The profile 40 may thus describe the titles of the user's digital songs and albums, whether rented or owned. When the user rents the rental property 22, some entertainment device in the rental property 22 may then be configured to offer the same music library 44. Similarly, the titles in the user's digital movie library 46 may also be exported to devices associated with the rental property 22 (such as the television 30 illustrated in FIG. 1). Indeed, exemplary embodiments may transfer files 48, electronic games 50, digital images 52, and any other content selections to any device associated with the rental property 22.

The profile 40 may include entertainment settings 60. As the reader may understand, many people have their favorite broadcast channels, websites, and satellite settings for their preferred entertainment offerings. These favorites may be learned over days, weeks, or even months of use. The entertainment settings 60 may even describe volume levels, lights levels, content ratings, and advertising preferences. Regardless, the entertainment settings 60 may also be transferred to computers, displays, audio systems, and any other device associated with the rental property 22. When the renter enters the rental property 22, the user's entertainment settings 60 are implemented for an immediate familiar feel.

The personalization may also include HVAC settings 62. Most people have preferred ambient settings for their indoor environments. The user's profile 40 may thus describe one or more seasonal temperature and humidity settings, which may be transferred to a heating, ventilation, and air conditioning ("HVAC") system 64 in the rental property 22. When the renter enters the rental property 22, the renter's HVAC settings 62 may be implemented for an immediate comfortable environment.

FIG. 3 illustrates security settings 70. Many homes and businesses have a security system 72. The security system 72 has a controller 74 that receives inputs from sensors 76 and cameras 78 to determine security events. The controller 74 may thus store and/or execute many rules and/or configurations for the sensors 76 and cameras 78. The user's security settings 70 may thus be sent or uploaded to the personalization server 42 for transfer to other locations or environments. So, when the user rents the rental property 22, exemplary embodiments may transfer the security settings 70 to a corresponding security system 80 monitoring the rental property 22. Electronic locks, for example, may be configured to use the same electronic keys. Entry and exit doors may be configured to the same operational hours. Security and landscaping lights may be programmed to the same on/off timing (perhaps accounting for latitude, longitude, and/or time zone). Permissions and restrictions for the cameras 78 may also be transferred to the rental property 22. The cameras 78 in bedroom and bathroom zones, for example, may be restricted or prevented from generating output video data, as per the user's home configuration or rules. Emergency numbers and other notification addresses may be also exported to the rental property 22, along with medicinal information and other personal health histories of any household occupants (such as children, parents, and pets). The user may thus enter the rental property 22 with safety and confidence.

Exemplary embodiments thus personalize the rental property 22. Whatever the user's profile 40 describes, exemplary embodiments may transfer the profile 40 for personalization of the rental property 22. Exemplary embodiments may thus transform the rental property 22 to the user's home environment to create a more pleasing and relaxing experience. Whether the rental property 22 is for business or pleasure, the rental property 22 may be tailored to the user's preferences.

Exemplary embodiments thus further enhance the rental industry. The personalization may be based on mobile communications, such as the detection or location of the user's mobile wireless device 20. Hotels, vacation rentals, and timeshare developments may create personalized rental experiences, based on the user's smartphone 26. Indeed, exemplary embodiments may even personalize parking and storage, as later paragraphs will explain. Entire facilities may be transformed, due to the user's predetermined preferences.

Figure 4:
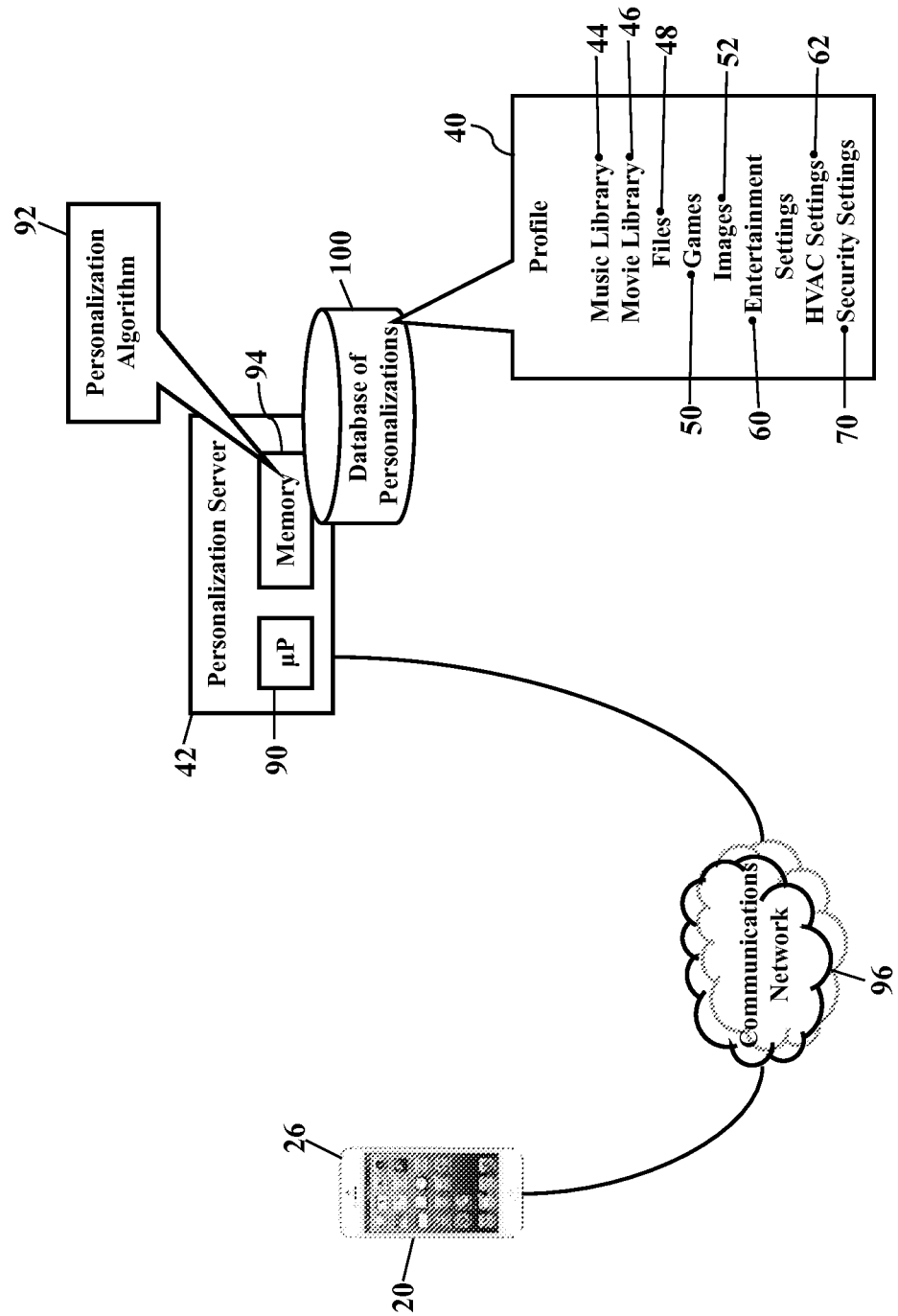
FIGS. 4-9 are more detailed block diagrams illustrating the operating environment, according to exemplary embodiments.

FIGS. 4-9 are more detailed block diagrams illustrating the operating environment, according to exemplary embodiments. FIG. 4 illustrates the personalization server 42 populating the user's profile 40. The personalization server 42 has a processor 90 (e.g., "µP"), application specific integrated circuit (ASIC), or other component that executes a personalization algorithm 92 stored in a local memory 94. The personalization algorithm 92 instructs the processor 90 to perform operations, such as generating the user's profile 40 using information received from a network interface to a communications network 96. The personalization server 42, for example, may collect information from one or more devices serving the user, such as the user's smartphone 26. The personalization server 42 may also receive or collect information from the user's televisions, set top boxes, security system, and appliances. The information may be received as packets of data according to a packet protocol (such as the Internet Protocol). The packets of data contain bits or bytes of data describing the contents, or payload, of a message. A header of each packet of data may contain routing information identifying an origination address and/or a destination address. The personalization algorithm 92 may then instruct the processor 90 to add the information to the user's profile 40 for analysis and for transfer.

FIG. 4 also illustrates a database 100 of personalizations. As people learn about rental personalization, many people will want to establish their own individual profile 40 for personalizing hotel rooms, rental cars, and other rental properties. Each user's individual profile 40 may thus be stored or maintained in the database 100 of personalizations. Over time, then, the database 100 of personalizations will grow with different profiles 40 for different users. Each user's profile 40 may have one or more entries describing a rich collection of digital artifacts for tailoring physical and digital environments to individual preferences.

The personalization server 42 may receive much more information. As this disclosure above explained, the personalization server 42 may receive many messages or information describing parameters, settings, rules, habits, and configurations related to the user's digital devices and life. The personalization server 42 may then store all this information as one or more entries in the user's profile 40. For example, the personalization server 42 may receive messages as packets of data describing the user's electronic files 48, such as electronic games 50, digital images 52, subscription applications, and any other content selections. The user's entertainment settings 60 may also be received, such as the user's favorite or habitual broadcast channels, websites, satellite settings, volume levels, lights levels, content ratings, and advertising preferences. The personalization server 42 may also receive the user's HVAC settings 62 describing preferred temperature and humidity. The personalization server 42 may also receive the security settings 70 of the user's security system 72. The personalization server 42 may even use some or all of this information to generate new profile information, as later paragraphs will describe. As the user's profile 40 grows with time, exemplary embodiments may develop a rich understanding of the user's preferences and habits.

Figure 5:
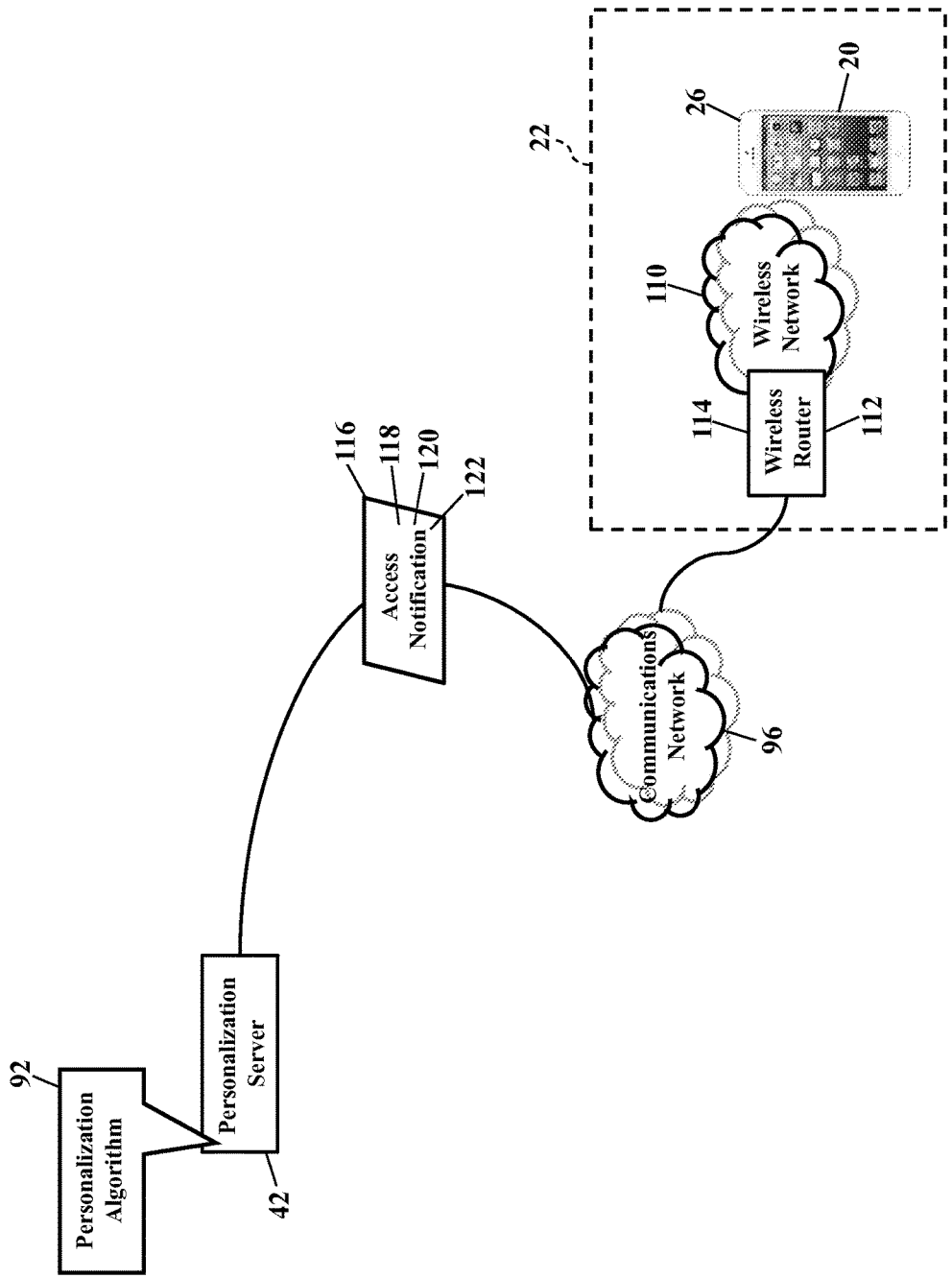

FIG. 5 illustrates transfer by presence. At some point the user's profile 40 may be used to configure any environment, such as the rental property 22. When the user rents the rental property 22, the rental property 22 may be configured according to the user's profile 40. FIG. 5 illustrates the configuration in response to a network presence of the user's smartphone 26. As the reader likely understands, many people carry a smartphone that interfaces with wireless networks. So, when the user's smartphone 26 enters the rental property 22, the smartphone 26 may establish wireless communication with a wireless network 110 serving the rental property 22. The smartphone 26, for example, may request access or permission to a local area wireless fidelity (or WI-FI®) network serving a hotel room or a rental home. Once the wireless network 110 detects the radio presence of the user's smartphone 26, exemplary embodiments may then begin configuring the rental property 22 to the user's profile 40.

The personalization server 42 may be notified. When the wireless network 110 detects the user's smartphone 26, exemplary embodiments may inform the personalization server 42. That is, the smartphone 26 may send an access request to an access device 112 serving the rental's wireless network 110. FIG. 5 illustrates the access device 112 as a wireless router 114, which commonly serves many residential and business wireless fidelity (WI-FI®) networks. However, the access device 112 may be any network interface to an access network, such as a gateway, cable modem, or DSL modem. Regardless, the user's smartphone 26 broadcasts a request that seeks access permission to the wireless network 110. When the access device 112 receives the access request, the access device 112 may send a packetized access notification 116 into the communications network 96 for routing and delivery to the network address associated with the personalization server 42. The wireless router 114, for example, may store or execute code or programming that forces or commands the access notification 116 when any device attempts to access the rental's wired or wireless network 110. The access notification 116 may thus alert the personalization server 42 to the presence of the user's smartphone 26. The access notification 116 may further include information that uniquely identifies the user's smartphone 26, such as data representing a cellular identifier (e.g., the smartphone's cellular telephone number (or "CTN") 118, International Mobile Subscriber Identity (or "IMSI") 120, or Mobile Station International Subscriber Directory Number ("MSISDN") 122). Whenever the mobile smartphone 26 sends messages or information, the smartphone 26 may self-report its CTN 118, IMSI 120, and/or its MSISDN 122.

Figure 6:
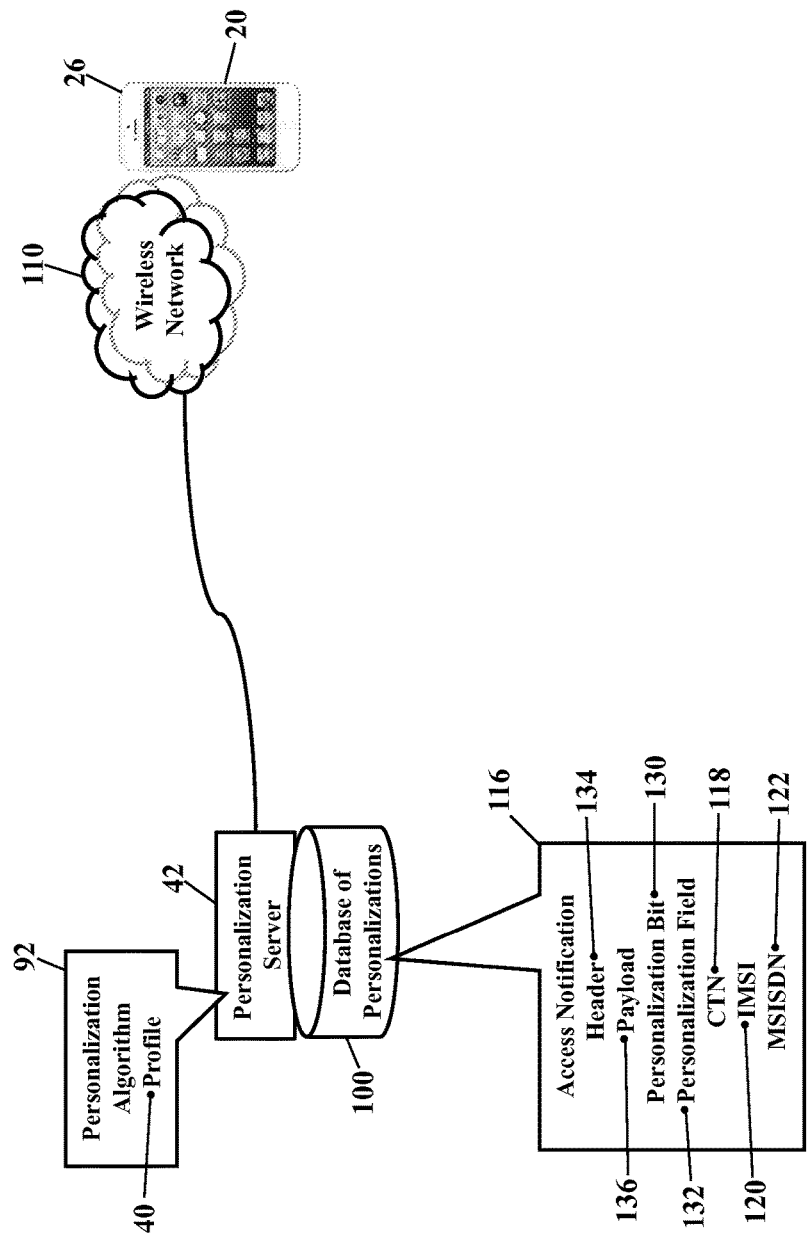

FIG. 6 illustrates structural personalization. When the personalization server 42 receives the access notification 116, the personalization algorithm 92 may instruct the personalization server 42 to inspect a header portion and/or a payload portion to determine if personalization is desired. For example, when the access device 112 sends the access notification 116, the access notification 116 may indicate that personalization is possible. The access device 112, for example, may add, set, or populate a personalization bit 130 or field 132 in a header 134 or payload 136 of the access notification 116. The access device 112 may thus be programmed to self-indicate when personalization is possible for the rental property 22. If the personalization bit 130 contains a logical "1," then the personalization server 42 may proceed with personalization. Alternatively, if the personalization field 132 in the header 134 or payload 136 contains predefined or recognized data (such as a unique sequence of bits or data), then the personalization server 42 may proceed with personalization. However, if the bit 130 and/or the field 132 contains a zero, null entry, or incorrect data, then the personalization server 42 may decline personalization.

The personalization server 42 may then consult the database 100 of personalizations. When the personalization server 42 determines that personalization is desired, the personalization algorithm 92 may then cause the personalization server 42 to query the database 100 of personalizations. Exemplary embodiments may query for the CTN 118, the IMSI 120, and/or the MSISDN 122 requesting access to the wireless network 110 (serving the rental property 22, as FIG. 5 illustrates). If the CTN 118, the IMSI 120, and/or the MSISDN 122 of the user's smartphone 26 is matched to an entry in the database 100 of personalizations, then the user's corresponding profile 40 may be retrieved and transferred for personalization.

Figure 7:
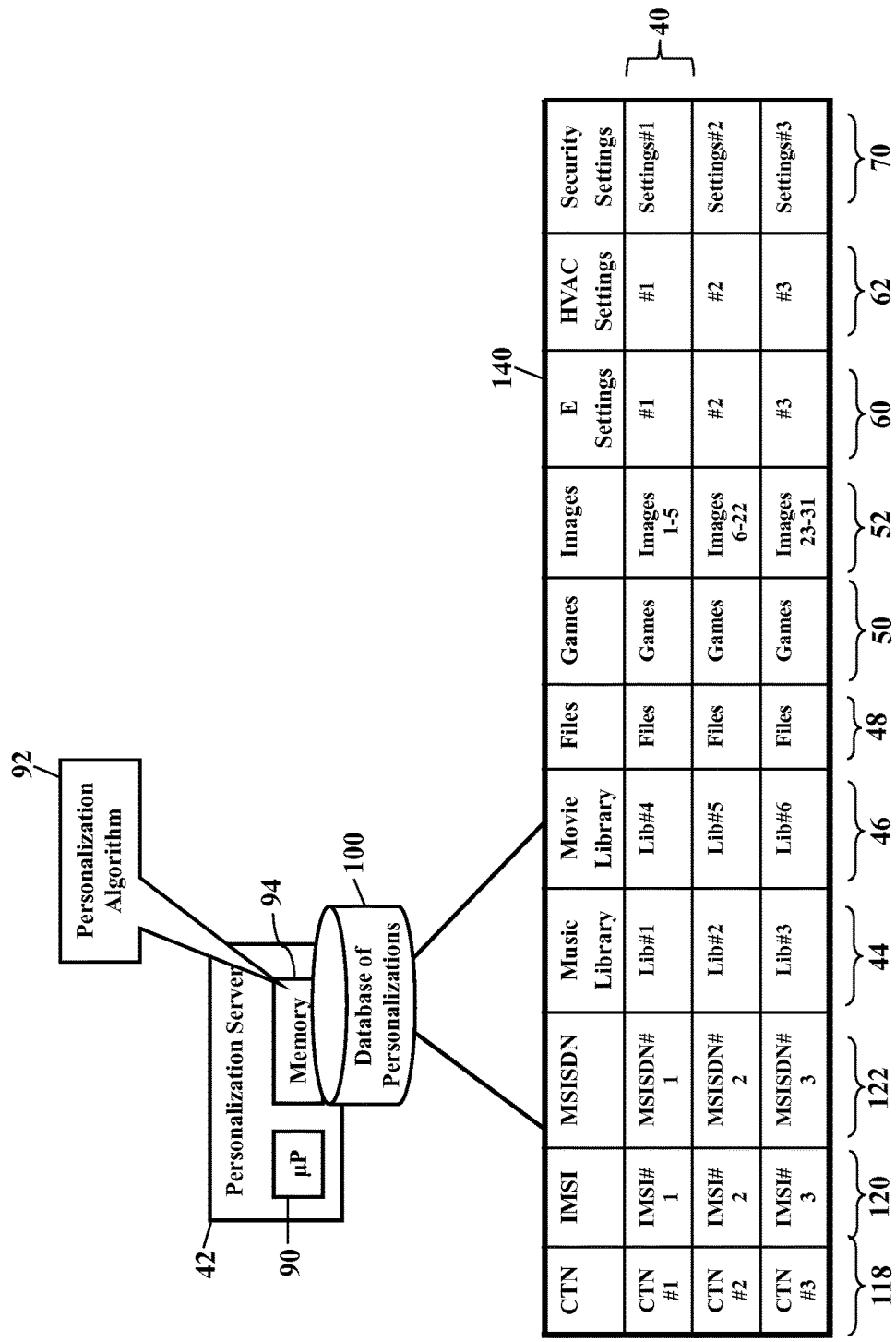

FIG. 7 illustrates database 100 of personalizations. For simplicity the database 100 of personalizations is illustrated as a table 140 that maps, relates, or associates different customers to their corresponding profiles 40. FIG. 7 illustrates the database 100 of personalizations as being locally stored in the memory 94 of the personalization server 42, but some or all of the database entries may be remotely maintained at some other server or location in the communications network (illustrated as reference numeral 96 in FIGS. 4-5). While FIG. 7 only illustrates a few entries, in practice the database 100 of personalizations may contain many entries for hundreds, thousands, or even millions of customers. For example, an entry may associate the customer's CTN 118, the IMSI 120, and/or the MSISDN 122 to the customer's music library 44 and movie library 46. Additional entries may include database associations for the corresponding user's electronic files 48, electronic games 50, digital images 52, entertainment ("E") settings 60, HVAC settings 62, and security settings 70. When the personalization server 42 receives the access notification 116, the personalization algorithm 92 causes the processor 90 to query for entries that match the query search term(s) detailed or described in the electronic access notification 116. If the database 100 of personalizations contains a matching entry, then the personalization server 42 may retrieve one or more of the entries in the corresponding profile 40.

Figure 8:
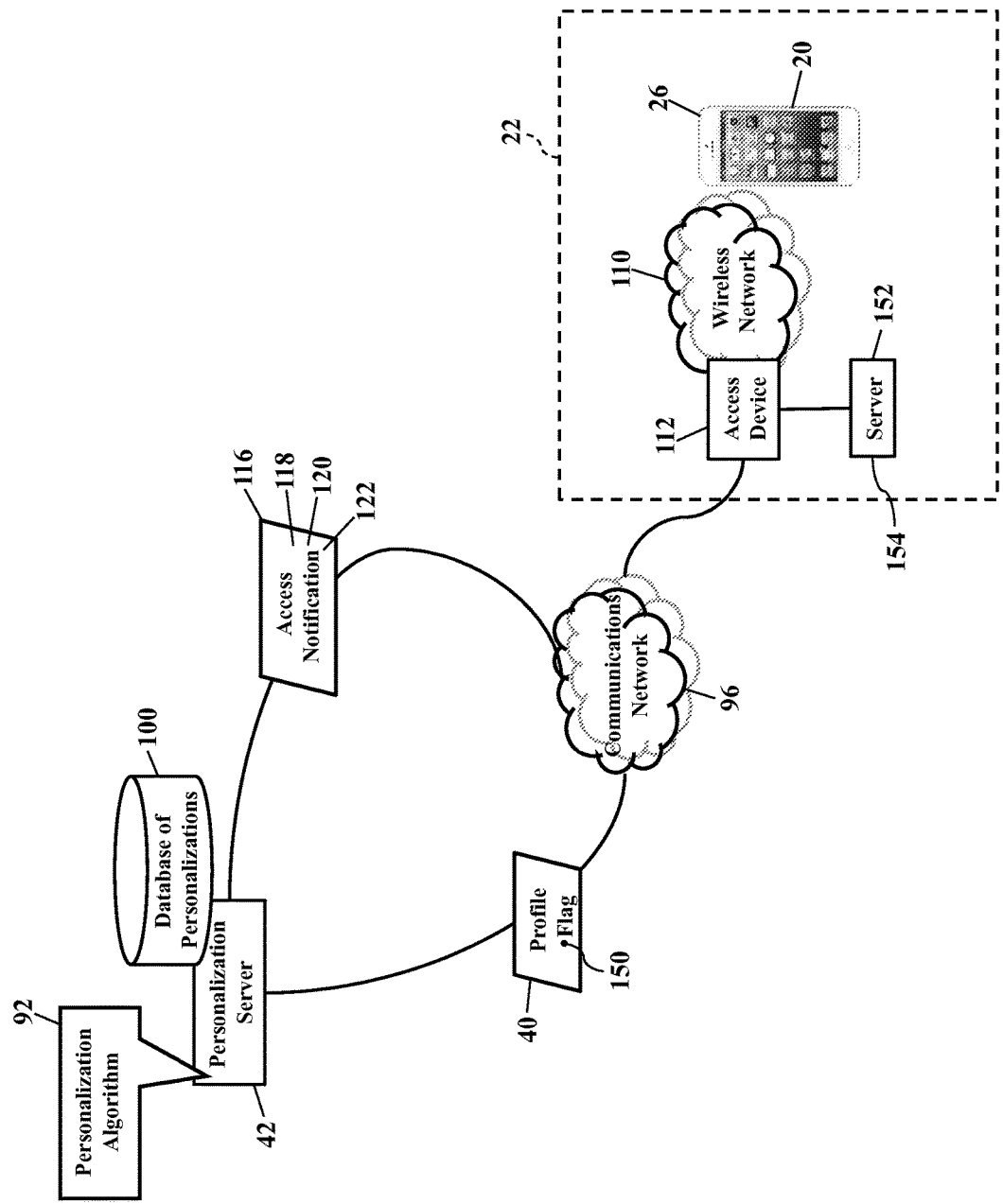

FIG. 8 illustrates the transfer. Now that the customer's profile 40 is known, exemplary embodiments may automatically transfer the profile 40 for personalization of the rental property 22. The personalization server 42 may send any information in the user's profile 40 into the communications network 96 for routing and delivery to a network address associated with the rental property 22. FIG. 8, for simplicity, illustrates the user's profile 40 routing to the access device 112 serving the wireless network 110 of the rental property 22. When the access device 112 receives the profile 40, the access device 112 may then forward the profile 40 to a management device 152 that manages the personalization of the rental property 22. While the management device 152 may be any processor-controlled device, FIG. 8 illustrates the management device 152 as a networked server 154. The server 154 interfaces with various other devices and controllers that personalize the rental property 22, according to the user's profile 40. The access device 112 thus routes the user's profile 40 to a network address of the server 154. When the server 154 receives the user's profile 40, the server 154 may then configure the rental property 22 to suit the user's profile 40. However, the profile 40 may also include a personalization flag 150. The personalization flag 150 may alert the access device 112 to forward the profile 40 to the management device 152 for personalization of the rental property 22.

Figure 9:
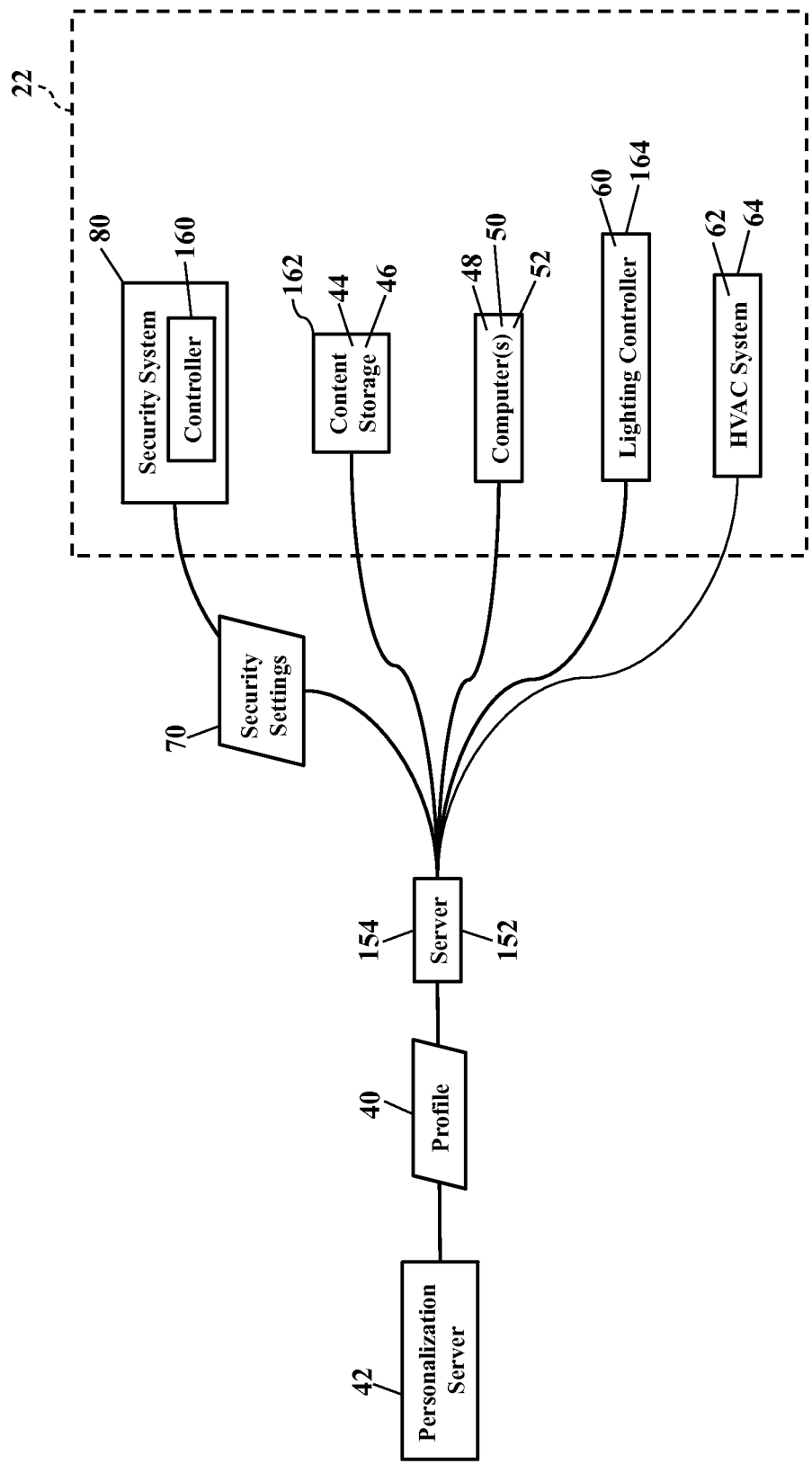

FIG. 9 illustrates the personalization. The server 154 reads the informational content of the user's profile 40 and begins issuing instructions or commands. A controller 160 of the security system 80, for example, is instructed to assume or implement the security settings 70, as described by the user's profile 40. A content storage device 162 may be instructed to retrieve content associated with the customer's music library 44 and movie library 46. Stationary and mobile computers may be instructed to retrieve content associated with the user's electronic files 48, electronic games 50, and digital images 52. A lighting controller 164 may be instructed to store and assume any lighting levels described by the entertainment settings 60. Sound systems may also be commanded, as per the entertainment settings 60. The HVAC system 64 serving the rental property 22 may assume temperature and other settings using the HVAC settings 62.

Exemplary embodiments thus personalize the rental property 22. When the presence of the user's wireless device 20 (such as her smartphone 26) is detected, exemplary embodiments may transfer the corresponding profile 40. The profile 40 is thus used to configure the rental property 22 to suit the renter's desires. The rental property 22 may thus be transformed as much as possible to the user's home environment. The user has a more pleasing and relaxing rental experience, thus driving positive rankings and votes on social mediums. The rental property 22, in short, is tailored to the user's digital life and preferences.

The database 100 of personalizations may be comprehensive. Many customers, subscribers, and/or users will elect to have their profiles 40 detailed in the database 100 of personalizations. Centralized storage and access permits automatic personalization, which will be a great convenience to most people. Moreover, the network-centric, centralized storage of the profile 40 allows worldwide retrieval and configuration, thus permitting global travel with home-like feel.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
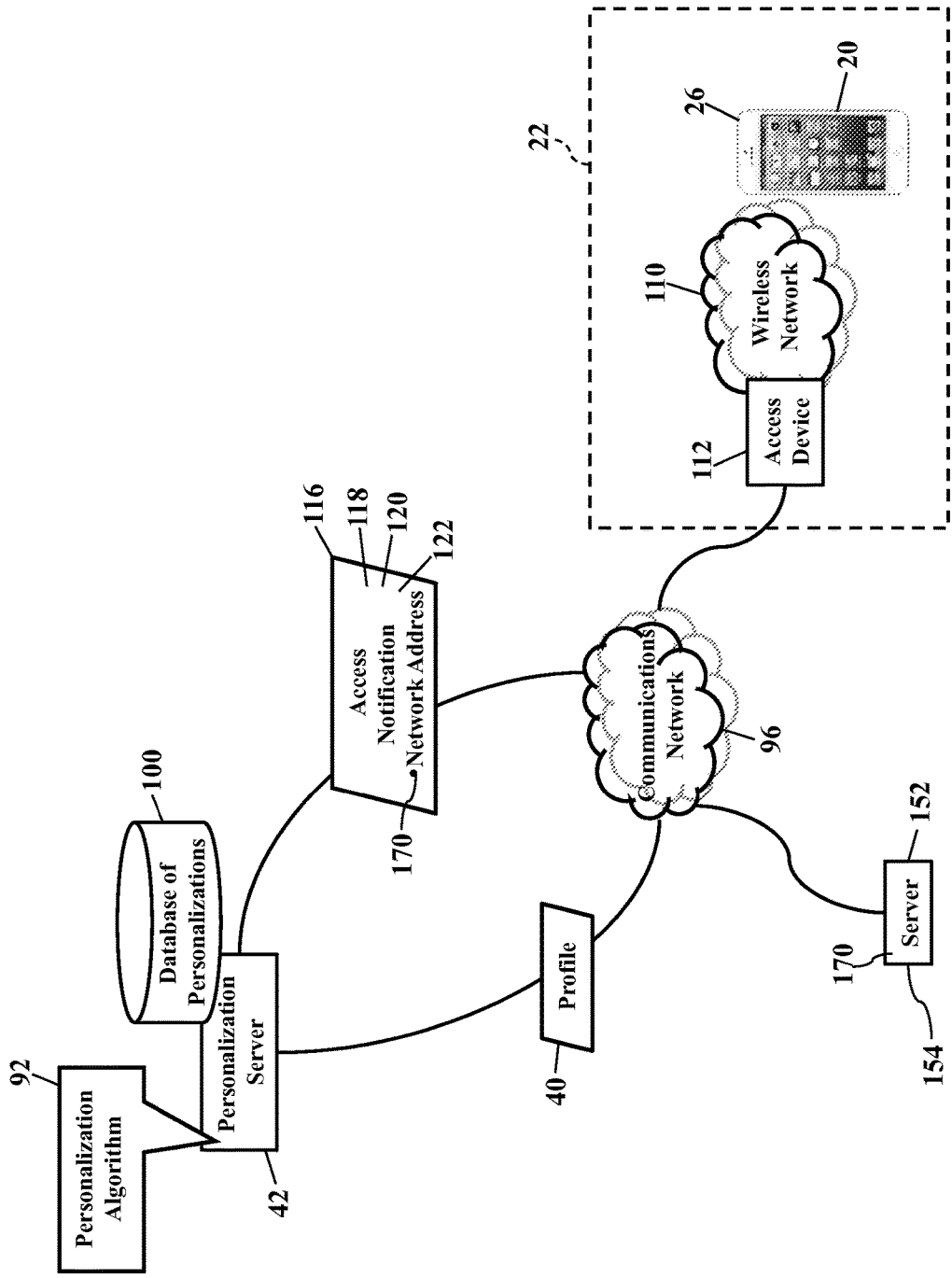
FIG. 10 is a schematic illustrating an access notification, according to exemplary embodiments.

FIG. 10 is a schematic further illustrating the access notification 116, according to exemplary embodiments. When the user's smartphone 26 requests permission to the wireless network 110 serving the rental property 22, the access device 112 may send the access notification 116 to the personalization server 42. Here, though, the access notification 116 may further include information identifying the management device 152 (such as the server 154) that manages the personalization of the rental property 22. For example, the access notification 116 may include the network address 170 of the server 154 that is responsible for personalizing the rental property 22. After the personalization server 42 retrieves the user's profile 40, the personalization server 42 may send the profile 40 directly to the network address 170 of the server 154 for implementation. Exemplary embodiments, then, may circumvent the access device 112 for faster response.

Figure 11:
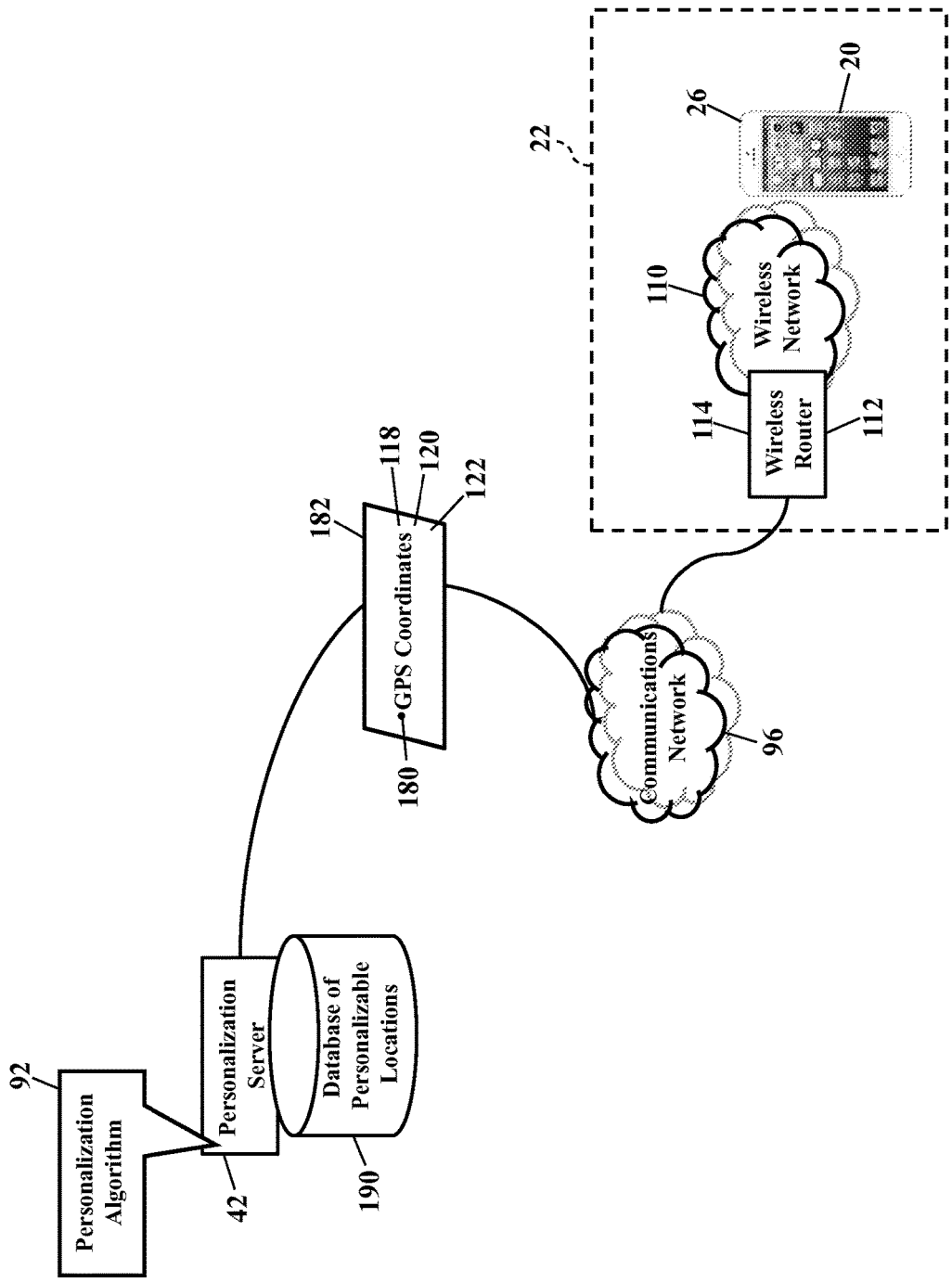
FIGS. 11-13 are schematics illustrating locational considerations, according to exemplary embodiments.
Figure 12:
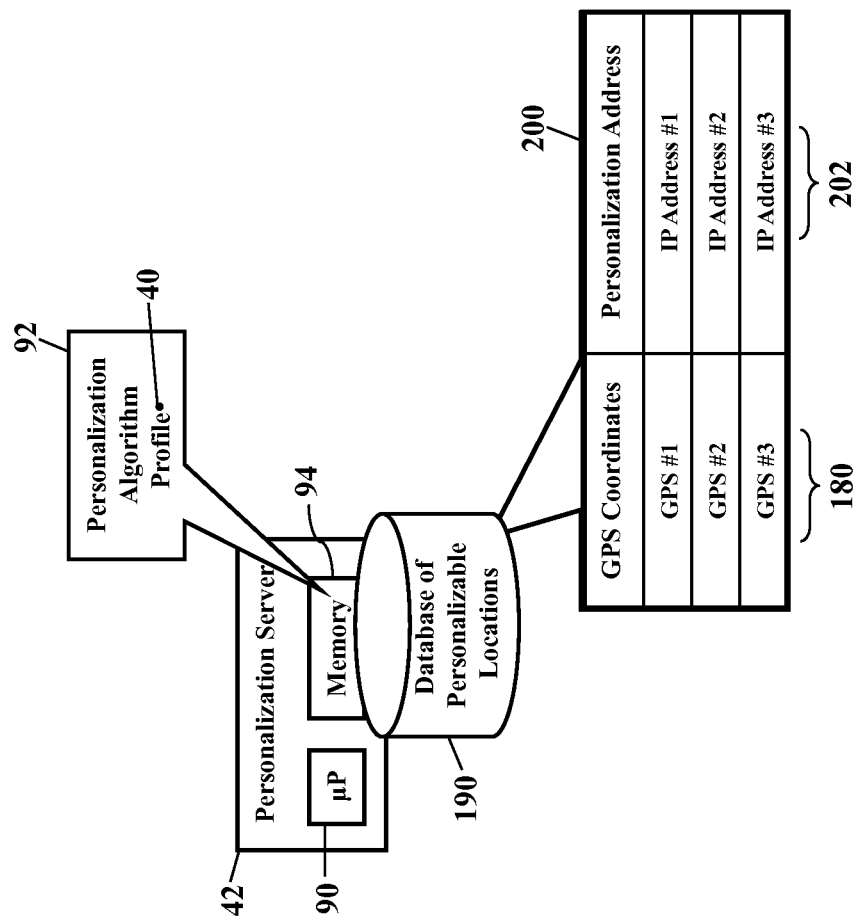
Figure 13:
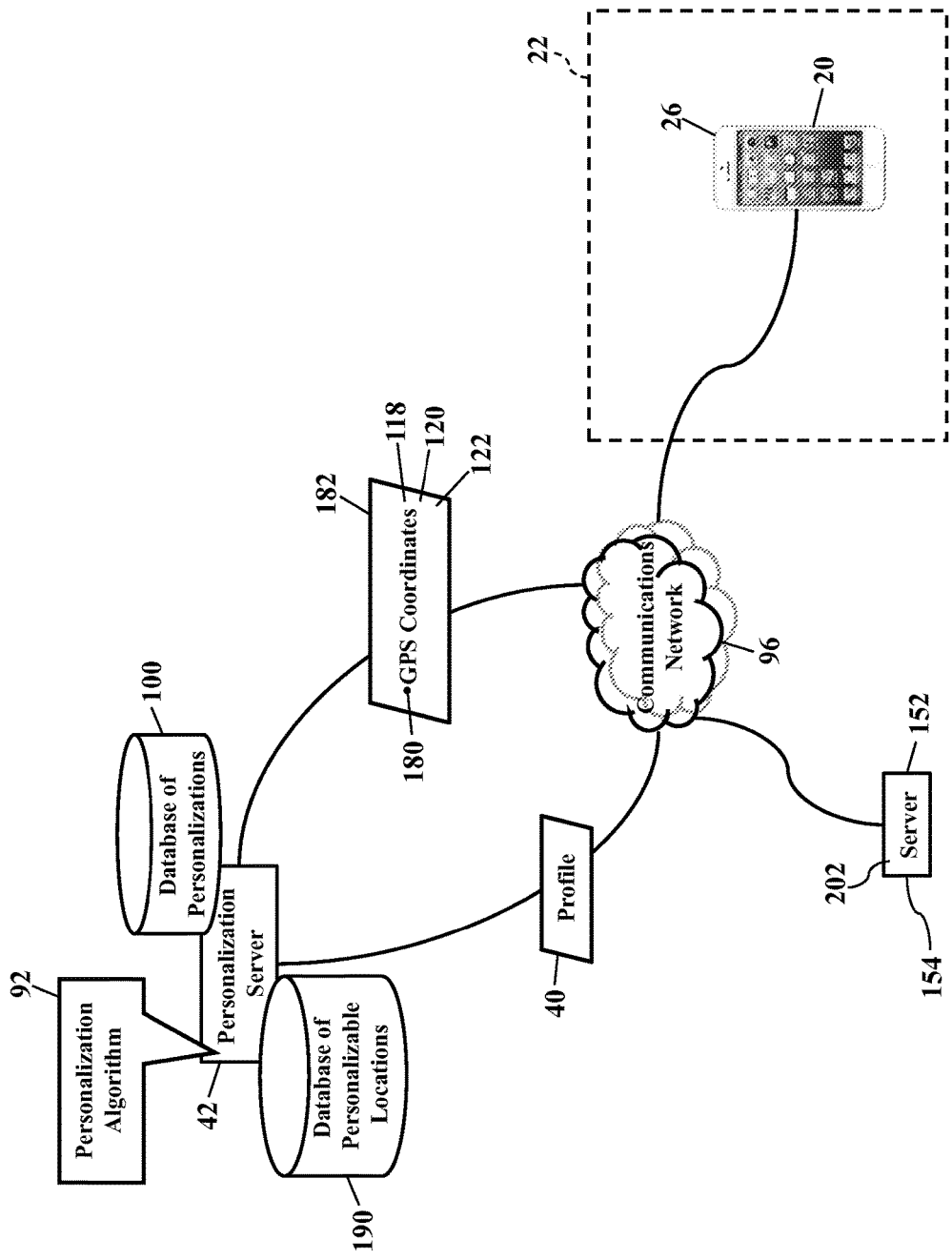

FIGS. 11-13 are schematics illustrating locational considerations, according to exemplary embodiments. As the reader may understand, many wireless devices have locational capabilities. The user's smartphone 26, for example, may have a global positioning system ("GPS") receiver that receives or generates GPS coordinate information 180. Many wireless devices, in other words, may determine their current geographic location 182 using the GPS coordinate information 180. Exemplary embodiments may thus use the GPS coordinate information 180 to further personalize the rental property 22.

Personalization may be based on location. As the user's wireless device 20 moves, the personalization server 42 may personalize any area or zone (such as the rental property 22), based on the current physical location. The user's smartphone 26, for example, may report its current geographical location 182 (such as the GPS coordinate information 180). The GPS coordinate information 180 may be reported using a cellular network as an interface to the communications network 96. When the smartphone 26 enters any geographic location, exemplary embodiments may determine if personalization is available. The smartphone 26 has a processor and memory (not shown for simplicity) that store and execute a mobile application. The mobile application, for example, causes the smartphone 26 to send its GPS coordinate information 180 into the communications network 96 as packets of data for routing and delivery to the network address of the personalization server 42. The GPS coordinate information 180 may be accompanied by information describing the smartphone's CTN 118, the IMSI 120, and/or the MSISDN 122.

The personalization server 42 may then consult a database 190 of personalizable locations. The database 190 of personalizable locations stores locations that participate in personalization. The database 190 of personalizable locations is illustrated as being locally stored in the personalization server 42. However, some or all portions may be remotely stored at some other device accessible using the communications network 96. Regardless, when the personalization server 42 receives the GPS coordinate information 180, the personalization server 42 may query the database 190 of personalizable locations for one or more matching entries.

FIG. 12 illustrates the database 190 of personalizable locations. The database 190 of personalizable locations is illustrated as a table 200 that maps, relates, or associates different physical locations to different network personalization addresses 202. While FIG. 12 only illustrates a few entries, in practice the database 190 of personalizable locations may contain many entries for hundreds, thousands, or millions of different locations. A hotel, for example, may have its physical location as one of the entries, with a database association to its corresponding Internet Protocol network address 202 of the management device (illustrated as reference numeral 152 in FIGS. 8-10) that manages its personalizations. If the smartphone's GPS coordinate information 180 matches an entry in the database 190 of personalizable locations, then the personalization server 42 may retrieve and send the user's profile 40 to the corresponding network address 202.

FIG. 13 illustrates the transfer. If the GPS coordinate information 180 is matched to an entry in the database 190 of personalizable locations, then that general location may participate in personalization. The personalization server 42 may then query the database 100 of personalizations for the CTN 118, the IMSI 120, and/or the MSISDN 122 submitted with the GPS coordinate information 180. The personalization server 42 retrieves the corresponding profile 40 from the database 100 of personalizations (as explained with reference to FIGS. 6-7). The personalization server 42 may then send any information in the user's profile 40 into the communications network 96 for routing and delivery to the personalization address 202 retrieved from the database 190 of personalizable locations. The personalization server 42, in other words, may send the user's profile 40 to the management device 152 that manages personalizations for the current geographic location 182 reported by the user's smartphone 26. FIG. 13 thus illustrates the user's profile 40 routing to the networked server 154 that serves the rental property 22 corresponding to the GPS coordinate information 180 reported by the user's smartphone 26. The server 154 may then configure the rental property 22 to suit the user's profile 40, as previously explained.

The database 190 of personalizable locations may also be comprehensive. As more and more properties participate in personalization, the database 190 of personalizable locations may grow with thousands or millions of entries. Indeed, as hotels have many individual rooms, each different room may be cross-referenced to the current geographic location 182 reported by the user's smartphone 26. That is, each different hotel room may be associated to its corresponding GPS coordinate information 180, thus allowing exemplary embodiments to tailor individual rooms.

Figure 14:
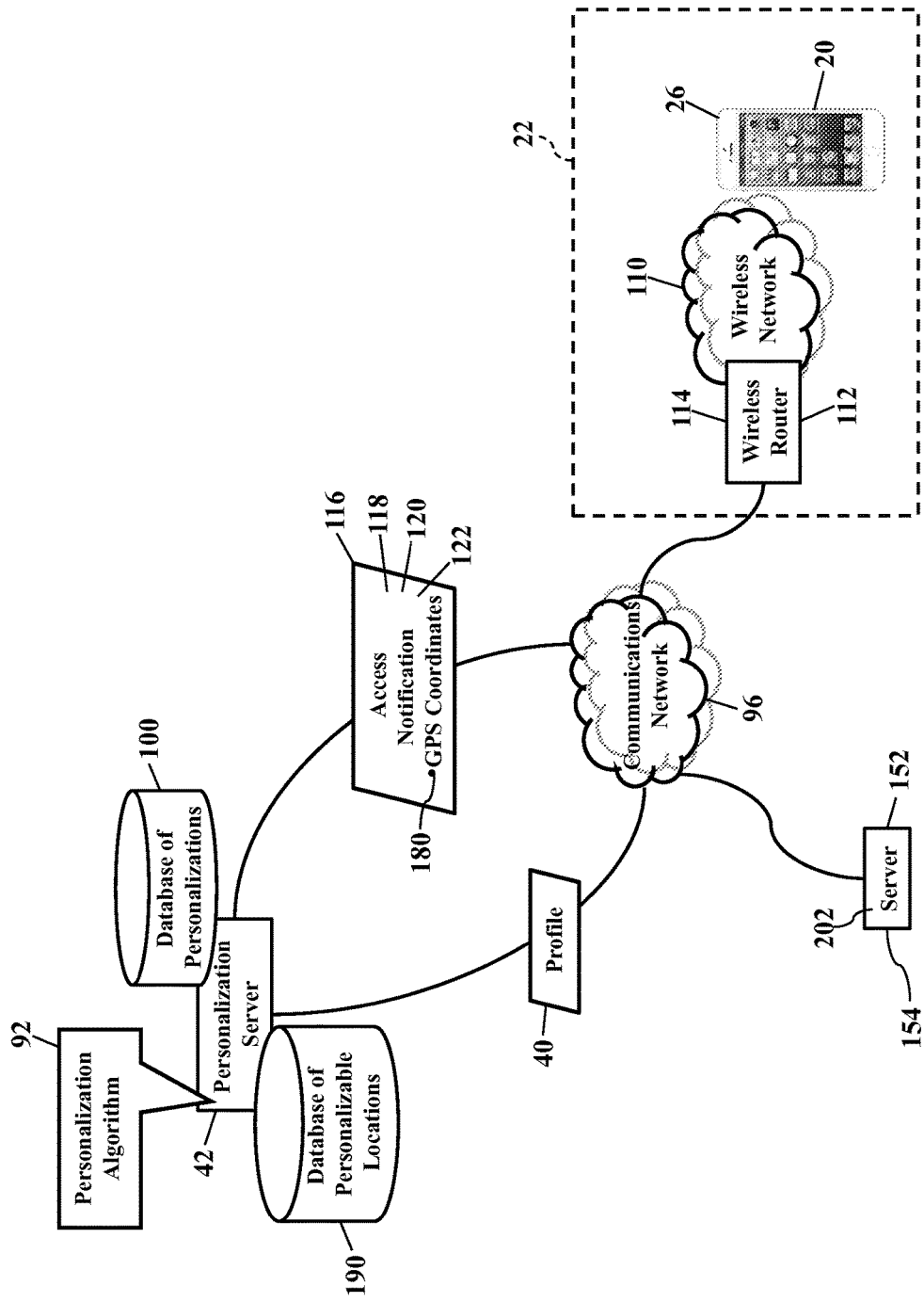
FIG. 14 is a schematic illustrating a hybrid solution, according to exemplary embodiments.

FIG. 14 is a schematic illustrating a hybrid solution, according to exemplary embodiments. Here exemplary embodiments may use a combination of presence and location to personalize the rental property 22. That is, when the user's smartphone 26 enters the rental property 22, the smartphone 26 may request access to the wireless network 110 serving the rental property 22. The smartphone 26 may also report its current geographical location 182 (perhaps using the GPS coordinate information 180) using either the local area wireless network 110 and/or the wire-area cellular network 96. The access notification 116, for example, may thus further include the GPS coordinate information 180 reported by the smartphone's CTN 118, IMSI 120, and/or MSISDN 122. The wireless network's access device 112 may send the access notification 116 as a packetized message to the personalization server 42, and the message may also include the personalization bit 130 or field 132, as earlier explained.

The personalization server 42 may then query for personalization. The personalization server 42 may consult the database 100 of personalizations for the profile 40 associated with the CTN 118, the IMSI 120, and/or the MSISDN 122. The personalization server 42 may additionally or alternatively query the database 190 of personalizable locations for the GPS coordinate information 180. Regardless, the personalization server 42 may retrieve and send the user's profile 40 to the corresponding personalization address 202 for personalization of the rental property 22.

Figure 15:
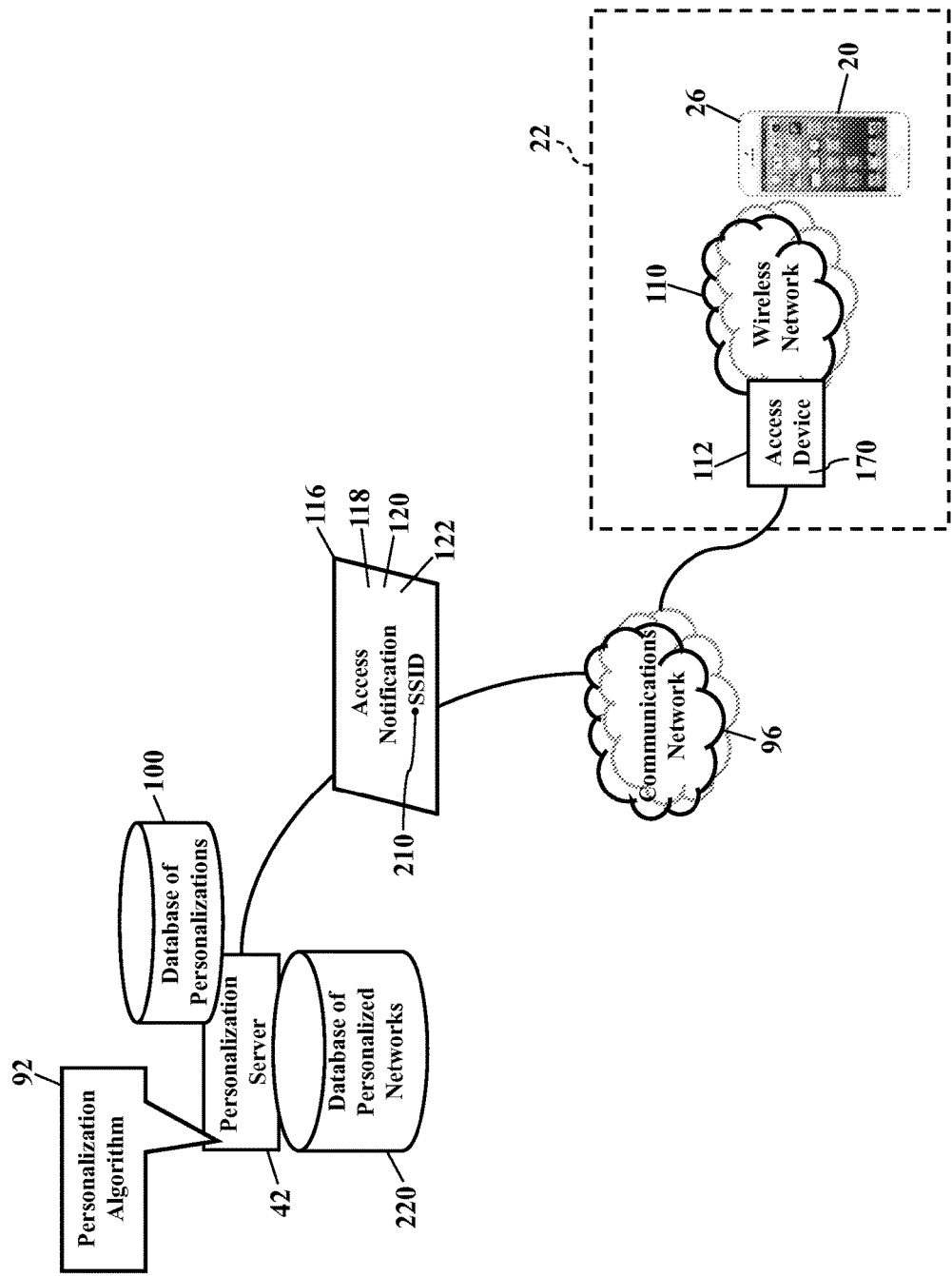
FIGS. 15-17 are schematics further illustrating network presence, according to exemplary embodiments.
Figure 16:
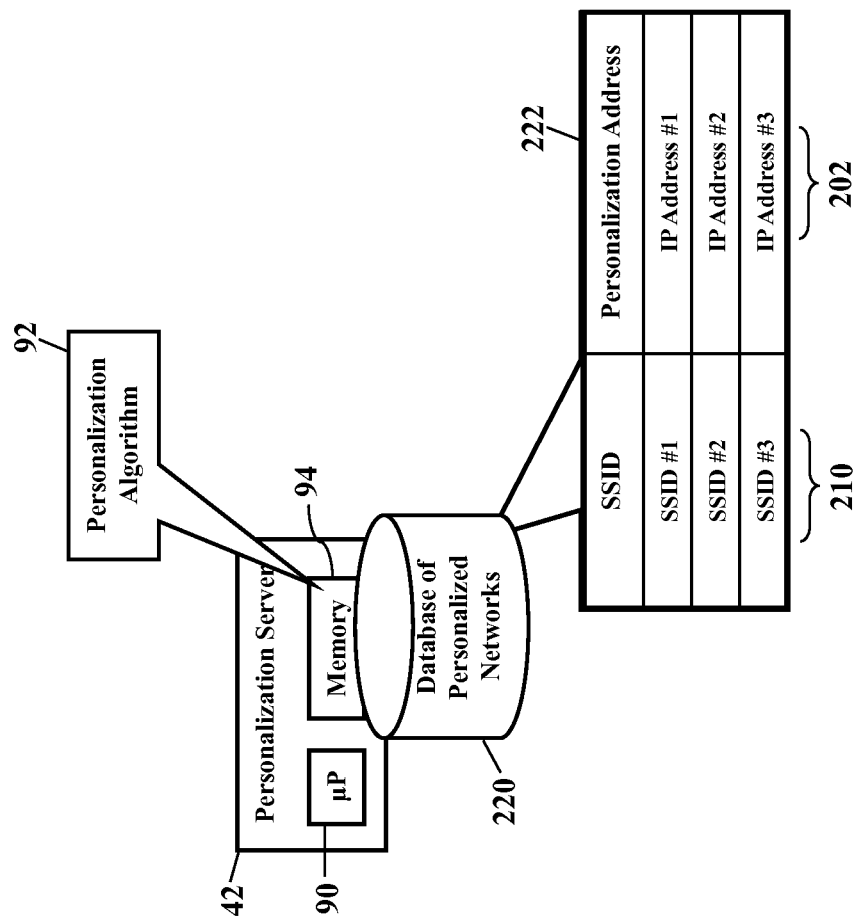
Figure 17:
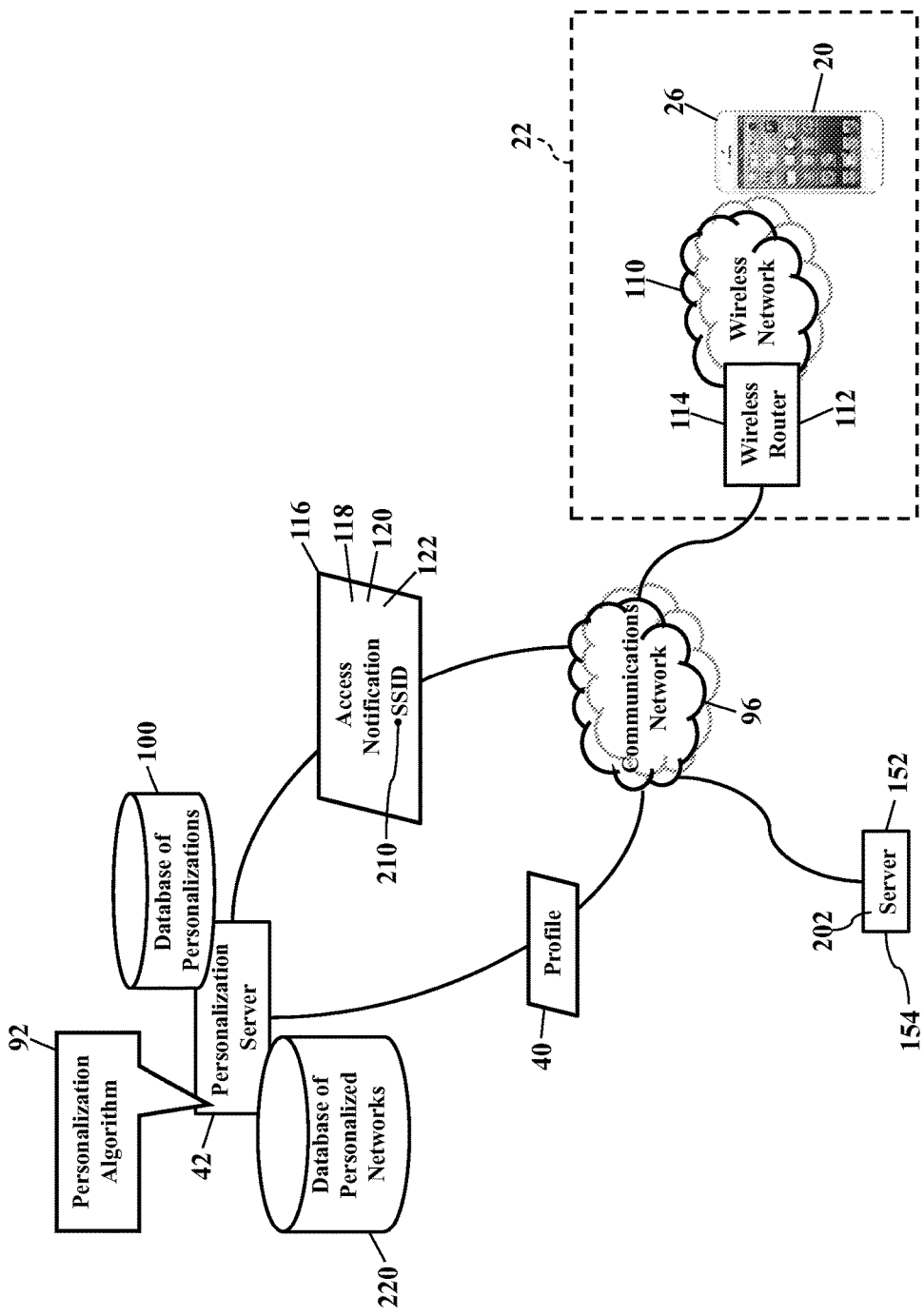

FIGS. 15-17 are schematics further illustrating network presence, according to exemplary embodiments. Here the access notification 116 may identify the wireless network 110. When the user's smartphone 26 request access permission to the wireless network 110, the access device 112 may again send the packetized access notification 116 to the network address associated with the personalization server 42. Here, though, the access notification 116 may identify the wireless network 110. The access notification 116, for example, may include information that uniquely identifies a service set identifier (or "SSID") 210 of the wireless network 110 serving the rental property 22. When the personalization server 42 receives the access notification 116, the personalization server 42 may query the database 100 of personalizations for the CTN 118, IMSI 120, and/or MSISDN 122 and retrieve the corresponding profile 40 (as this disclosure explains with reference to FIGS. 6-8).

The personalization server 42 may further consult a database 220 of personalized networks. The database 220 of personalized networks may be queried to determine the wireless networks that participate in personalization. Referring to FIG. 16, the database 220 of personalized networks is illustrated as a table 222 that associates different network identifiers 210 to their corresponding personalization addresses 202. When the personalization server 42 receives the access notification 116, the personalization server 42 may inspect the access notification 116 for the service set identifier (or "SSID") 210 of the wireless network 110 serving the rental property 22. The personalization server 42 may then query the database 220 of personalized networks for the SSID 210. If a matching entry is determined, the personalization server 42 retrieves the corresponding personalization address 202. As FIG. 17 illustrates, the personalization server 42 may thus send the user's profile 40 to the corresponding personalization address 202 for personalization of the rental property 22, as earlier explained.

Figure 18:
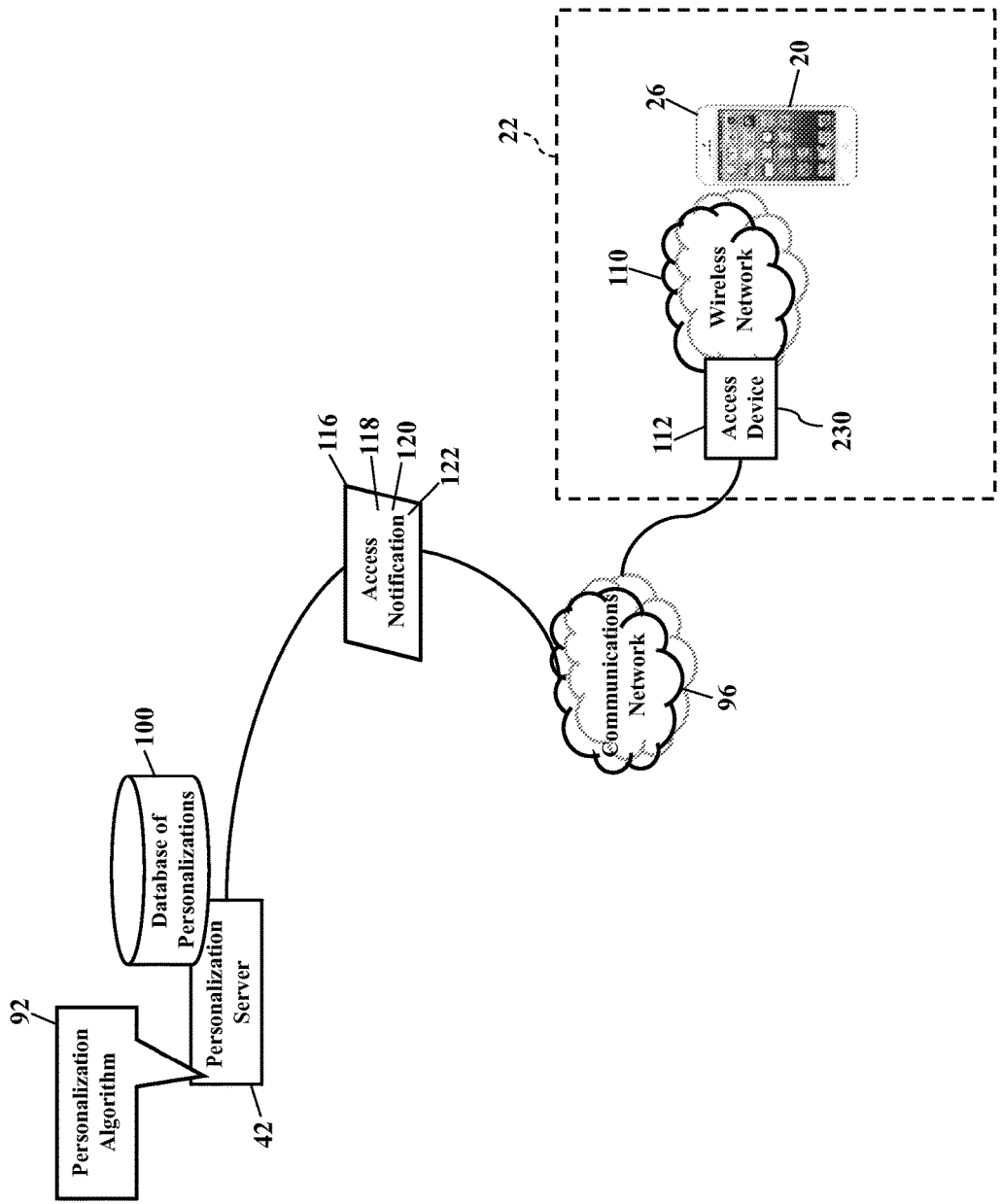
FIGS. 18-20 are schematics illustrating personalization of data rates, according to exemplary embodiments.
Figure 19:
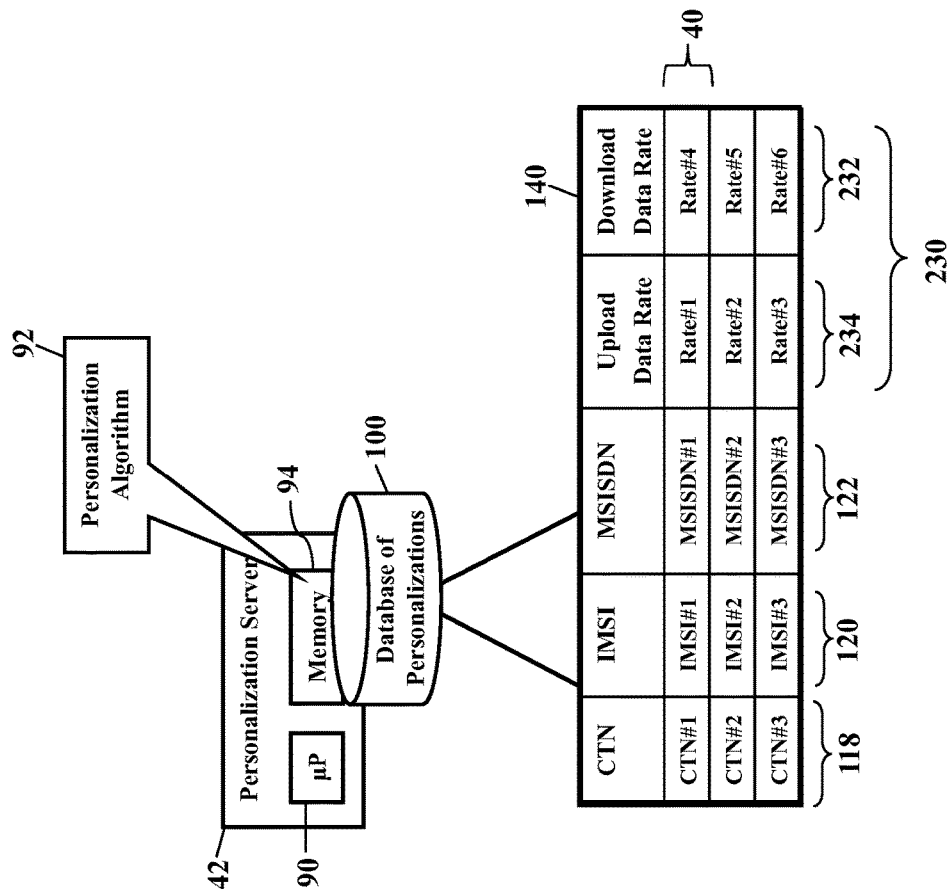
Figure 20:
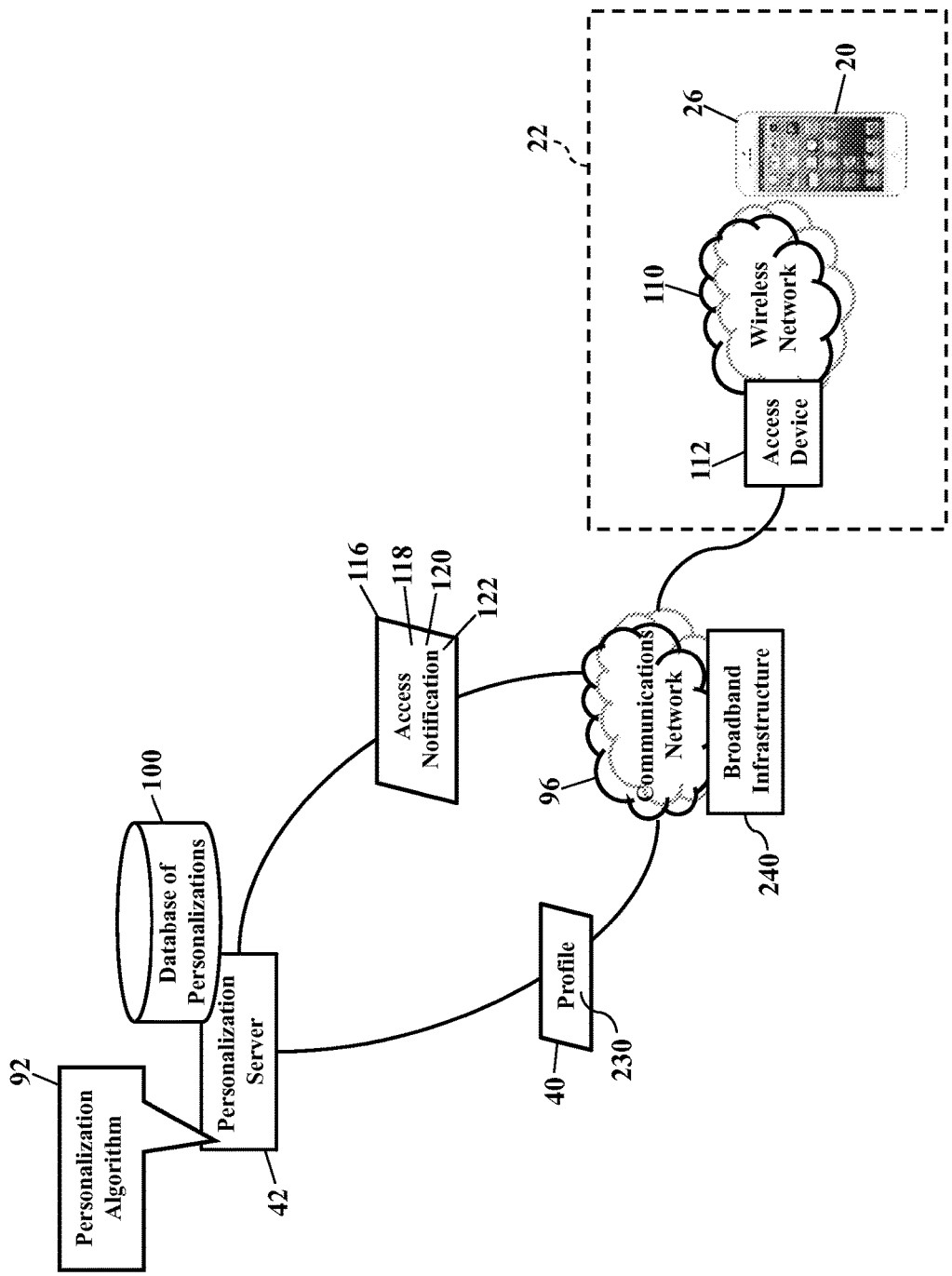
Figure 21:
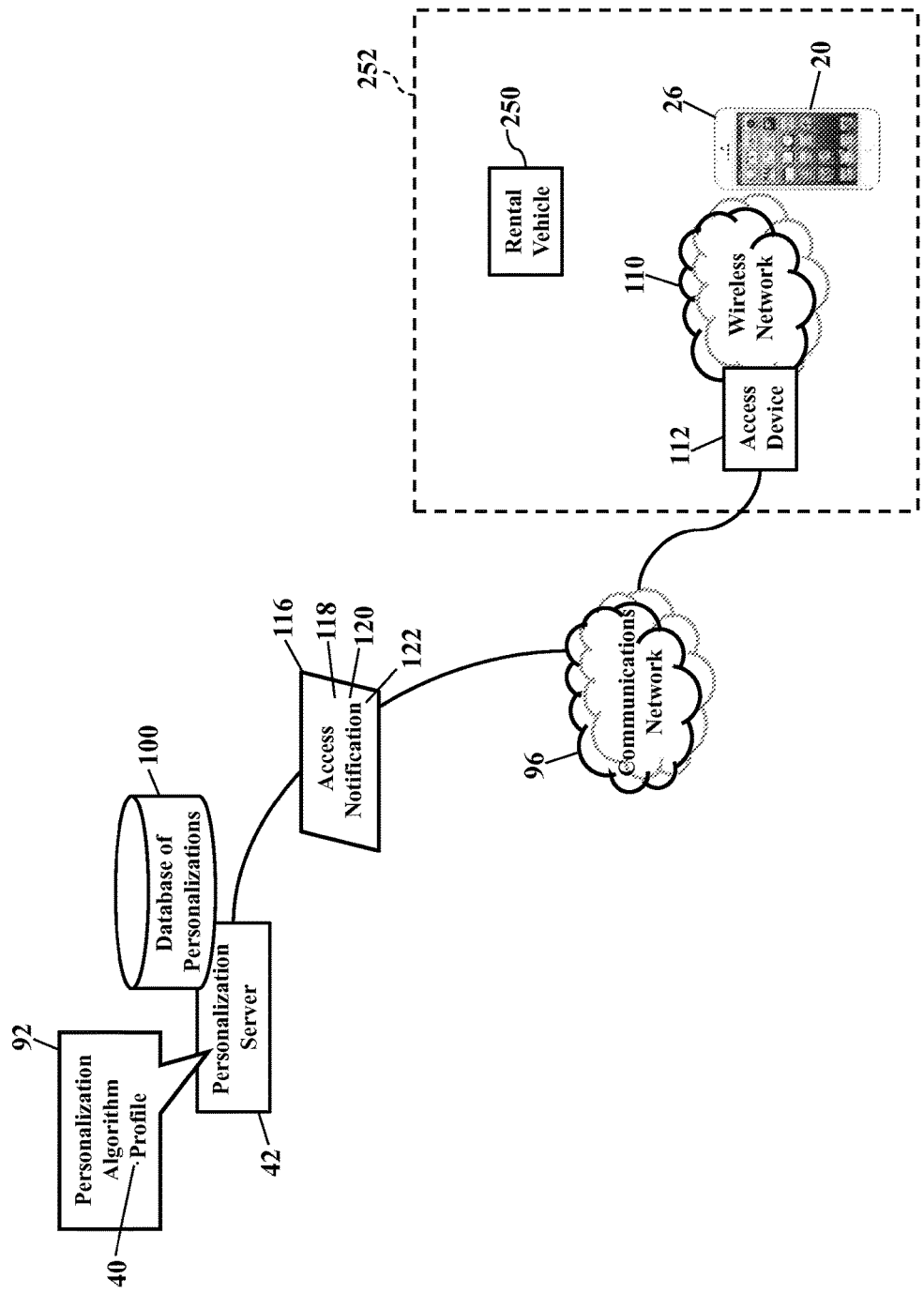
FIG. 21-25 are diagrams illustrating a rental car operating environment, according to exemplary embodiments.
Figure 22:
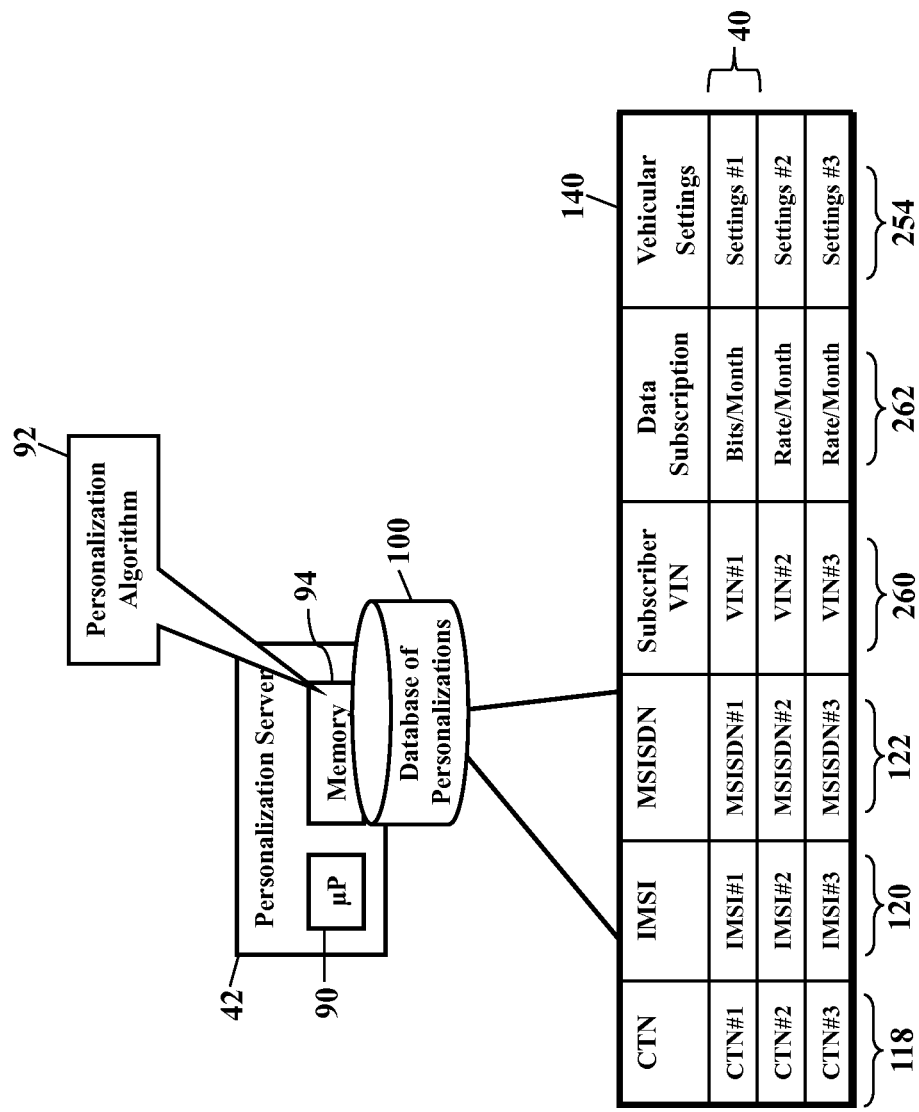

FIGS. 18-20 are schematics illustrating personalization of data rates, according to exemplary embodiments. As the reader may understand, many people subscribe to a broadband Internet service from a service provider. The user, for example, may be a hardwired digital subscriber line ("DSL") customer, a cable customer, and/or a fiber optic customer. Whatever the physical connection, the customer's subscription service may have one or more maximum data rates 230 at which the broadband service is provided. For example, the customer may have a maximum download data rate 232 of twenty megabits per second (20 Mb/s). The customer may have a different maximum upload data rate 234 of five megabits per second (5 Mb/s). Other customers may have higher or lower maximum data rates 230, depending on their individual subscription plans. Whatever a subscriber's broadband subscription plan, exemplary embodiments may transfer the maximum download data rate 232 and/or the maximum upload data rate 234 to the broadband service serving the rental property 22. The rental property 22 may thus personalized to the renter's residential or business subscription plan for broadband service.

As FIG. 18 illustrates, the user's smartphone 26 is detected. The smartphone 26 may request access permission to the wireless network 110 serving the rental property 22. The access device 112 may send the packetized access notification 116 into the communications network 96 for routing and delivery to the network address associated with the personalization server 42. The access notification 116 alerts the personalization server 42 to the presence of the user's smartphone 26. The access notification 116 may further include the smartphone's cellular identifier (such as the telephone number (or "CTN") 118, International Mobile Subscriber Identity (or "IMSI") 120, or Mobile Station International Subscriber Directory Number ("MSISDN") 122). The personalization server 42 may then query the database 100 of personalizations for the CTN 118, the IMSI 120, and/or the MSISDN 122 associated with the smartphone 26. The personalization server 42 retrieves the corresponding profile 40, as this disclosure previously explained.

FIG. 19 illustrates an enhancement to the database 100 of personalizations. Here each profile 40 may further include entries for the maximum data rates 230 associated with each cellular customer. That is, the database 100 of personalizations may include database associations between the customer's CTN 118, the IMSI 120, and/or the MSISDN 122 to the customer's maximum data rates 230 for broadband data service. The personalization server 42 may thus query for entries that match the cellular customer's CTN 118, the IMSI 120, and/or the MSISDN 122. If the database 100 of personalizations contains a matching entry, then the personalization server 42 may retrieve the corresponding profile 40, including the maximum download data rate 232 and/or the maximum upload data rate 234 for the cellular customer's broadband data service.

FIG. 20 illustrates the transfer. Now that the customer's maximum data rates 230 are known, exemplary embodiments may automatically transfer the maximum data rates 230 for personalization of the rental property 22. The personalization server 42 may send the user's profile 40 (including the maximum data rates 230) into the communications network 96 for routing and delivery to the network address associated with the rental property 22. FIG. 20, for simplicity, illustrates the user's profile 40 routing to the access device 112 serving the rental property 22. When the access device 112 receives the maximum data rates 230, the access device 112 may then negotiate for the same maximum data rates 230. That is, the access device 112 may commence implementing the maximum data rates 230 for the broadband DSL, cable, or fiber optic broadband infrastructure 240 serving the rental property 22. So, even though the user of the smartphone 26 may only temporarily or transiently occupy the rental property 22, the access device 112 configures the access network to the subscriber's broadband subscription plan. The subscribing user thus enjoys the same maximum data rates 230 as her home or business broadband service, even though occupying the rental property 22 for a short stay.

FIG. 21-25 are more diagrams illustrating the operating environment, according to exemplary embodiments. Here the user's profile 40 may be used to personalize a rental vehicle 250. As the reader likely understands, many people rent cars and trucks for personal and business reasons. The presence or detection of the user's smartphone 26 may thus be used to personalize the rental vehicle 250, according to the corresponding profile 40. Suppose, again, that the user's smartphone 26 requests access to the wireless network 110 serving a rental car facility 252. The access device 112 may again send the access notification 116 to the personalization server 42, perhaps including information describing the CTN 118, the IMSI 120, and/or the MSISDN 122 of the smartphone 26. The personalization server 42 queries the database 100 of personalizations and retrieves the matching profile 40 (as previously explained).

FIG. 22 again illustrates the database 100 of personalizations. Here, though, each profile 40 may further include entries or information describing vehicular settings 254. The vehicular settings 254 describe any information or data that may be used to personalize cars, trucks, and other equipment (such as the rental vehicle 250 illustrated in FIG. 21). The database 100 of personalizations may thus include database associations between the customer's CTN 118, the IMSI 120, and/or the MSISDN 122 to the customer's personal vehicle. Many vehicles, for example, may be uniquely identified by a vehicle identification number (or "VIN") 260. The database 100 of personalizations may thus associate the user's or subscriber's smartphone 26 to the vehicular settings 254 of their personal vehicle (as identified by the VIN 260). The personalization server 42 may thus query for entries that match the cellular customer's CTN 118, the IMSI 120, and/or the MSISDN 122 and retrieve the corresponding vehicular settings 254.

The vehicular settings 254 describe configurable parameters for vehicles. The vehicular settings 254, for example, may describe driver and passenger adjustable seat and mirror settings, thus allowing transfer of the user's personalized memory positions. The vehicular settings 254 may also include radio settings of favorite AM/FM/Satellite radio channels. Indeed, exemplary embodiments may even retrieve and transfer the user's music library 44 (as earlier explained). The vehicular settings 254 may also include display colors and position or orientation of instrumentation lights and digital gauges. As the reader may understand, many vehicles allow the driver to select ambient colors of interior lights and instrumentation clusters. The driver may even choose what information (e.g., speed, RPM, and coolant temperature) is displayed by an instrument panel. The vehicular settings 254 may also describe steering wheel settings (such as tilt angle and telescopic length) and pedal positions (brake, clutch, and accelerator). The vehicular settings 254 may further include climate controls, such as driver and passenger temperature settings. The vehicular settings 254, in short, may include any information that is transferable between different vehicles.

The user's profile 40 may also include a vehicular data subscription 262. Today many newer vehicles have cellular and/or satellite data capability. That is, the vehicle may have a wireless cellular and/or satellite receiver for wirelessly receiving and sending data. The rental vehicle 250 may thus be a wireless "hotspot" for passengers inside the vehicle. Exemplary embodiments, then, may also have database associations between the customer's smartphone 26, her personal vehicle's VIN 260, and its corresponding data subscription 262. AT&T® and ON STAR®, for example, currently offer different monthly data plans for wireless LTE service by vehicles. The subscriber may purchase plans ranging from 300 MB to 10 GB of data service per month. Whatever the service plan, the user's personalization profile 40 may include one or more entries describing the user's vehicular data subscription 262.

Figure 23:
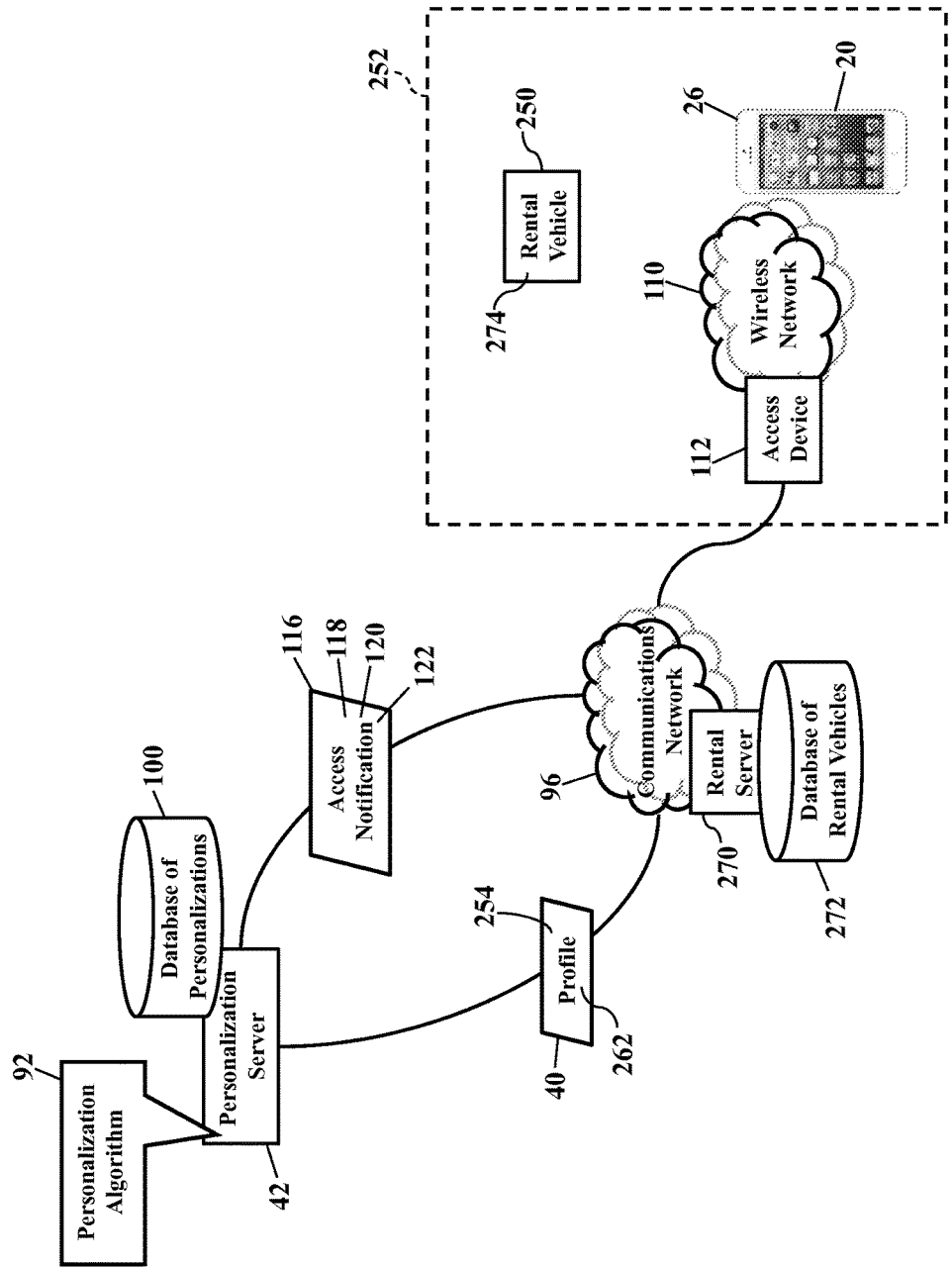

FIG. 23 illustrates the profile transfer. Once the profile 40 is retrieved, the rental vehicle 250 may be personalized. The personalization server 42 sends the user's profile 40 (including the vehicular settings 254 and/or the vehicular data subscription 262) into the communications network 96. FIG. 23, for simplicity, illustrates the user's profile 40 routing to an Internet Protocol network address of a rental server 270 operated by a rental car service provider. The rental server 270 may thus be some device or network destination that receives the profiles 40 for personalization of rental vehicles. When the rental server 270 receives the profile 40, the rental server 270 may associate the renter's smartphone 26 to the rental vehicle 250. That is, the rental server 270 has a processor and memory (not shown for simplicity) that executes an algorithm for database management. The rental server 270 queries a database 272 of rental vehicles for the smartphone 26 of the user renting the rental vehicle 250. The database 272 of rental vehicles, in other words, stores database associations between the user's smartphone 26 and the VIN 274 associated with the rental vehicle 250. When the rental vehicle 250 is reserved for rental, the rental reservation or contract may require entry of the renter's cellular telephone number (or "CTN") 118. The database 272 of rental vehicles may thus establish a database association between the renter's CTN 118 and the VIN 274 of the assigned rental vehicle 250. Once the rental server 270 receives the profile 40, the rental server 270 may transfer the renter's vehicular settings 254 and/or the vehicular data subscription 262 to a network address of the rental vehicle 250. The profile 40, for example may be sent over-the-air using the wireless cellular and/or satellite receiver installed in the rental vehicle 250. One or more controllers in the rental vehicle 250 may thus adopt and implement the renter's vehicular settings 254 and/or the vehicular data subscription 262. The rental vehicle 250 is thus personalized to the profile 40, based on detection or presence of the user's smartphone 26.

Figure 24:
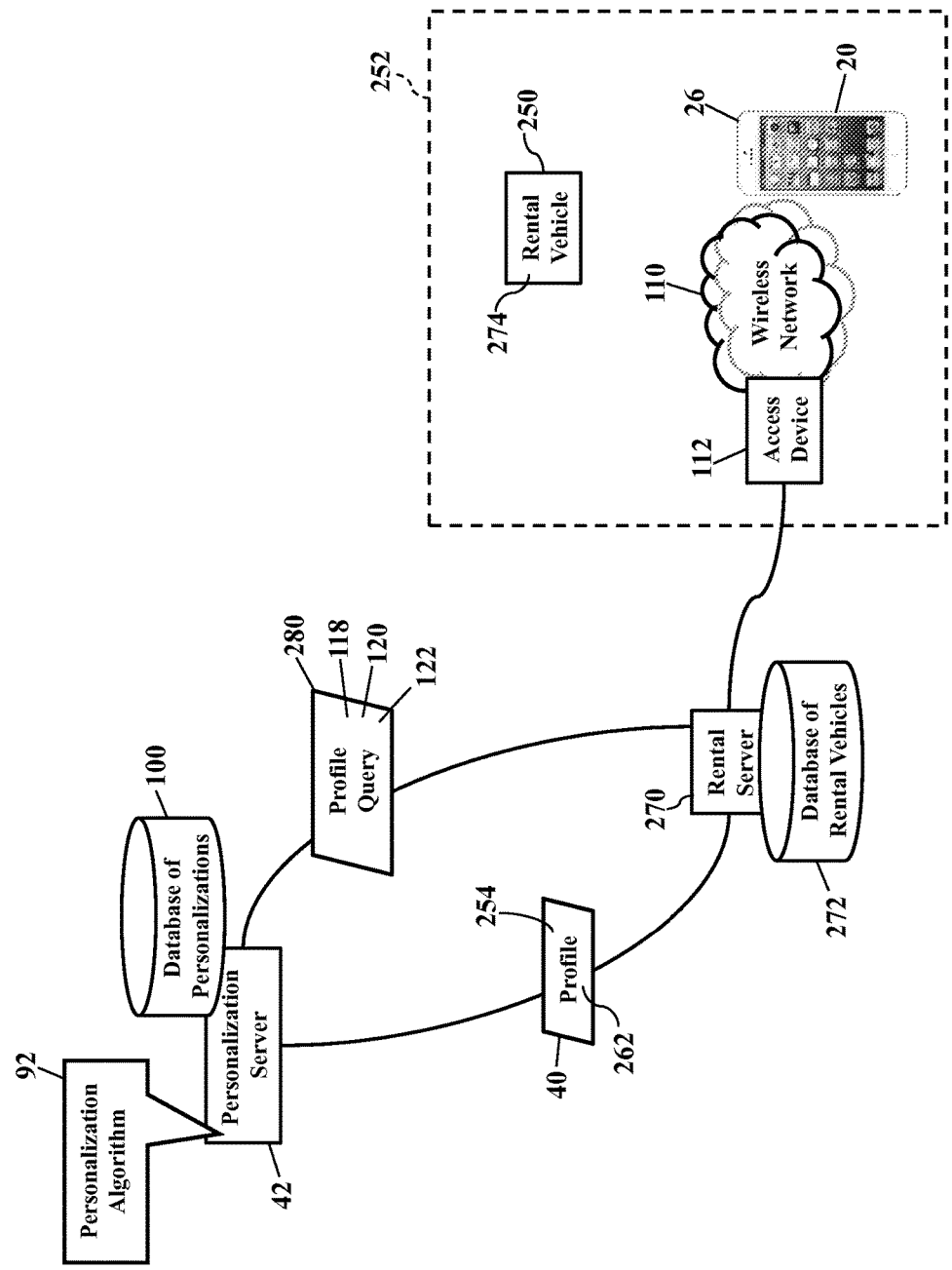

FIG. 24 further illustrates the rental server 270. When the renter's smartphone 26 requests access to the wireless network 110 serving the rental car facility 252, here the access device 112 may directly notify the rental server 270. That is, the access device 112 may send a message to the network address of the rental server 270. The message may include information or data describing the CTN 118, the IMSI 120, and/or the MSISDN 122 of the smartphone 26. The rental server 270 may then send a profile query 280 to the personalization server 42, and the profile query 280 may include the CTN 118, the IMSI 120, and/or the MSISDN 122. The personalization server 42 queries the database 100 of personalizations and retrieves the matching profile 40 (as previously explained). The personalization server 42 return sends the profile 40 into the communications network (not shown for simplicity) for routing and delivery to the Internet protocol address of the rental server 270. The rental server 270 may then query the database 272 of rental vehicles for the CTN 118, the IMSI 120, and/or the MSISDN 122 of the smartphone 26 associated with the renter of the rental vehicle 250. The database 272 of rental vehicles performs a lookup for the VIN 274 assigned to the matching renter's smartphone 26. Now that the rental vehicle 250 is known (by the VIN 274), the rental server 270 may transfer the renter's vehicular settings 254 and/or the vehicular data subscription 262 to a network address of the rental vehicle 250 (perhaps using the over-the-air wireless cellular and/or satellite receiver). Once again, then, the rental vehicle 250 is personalized to the profile 40, based on detection or presence of the user's smartphone 26.

Figure 25:
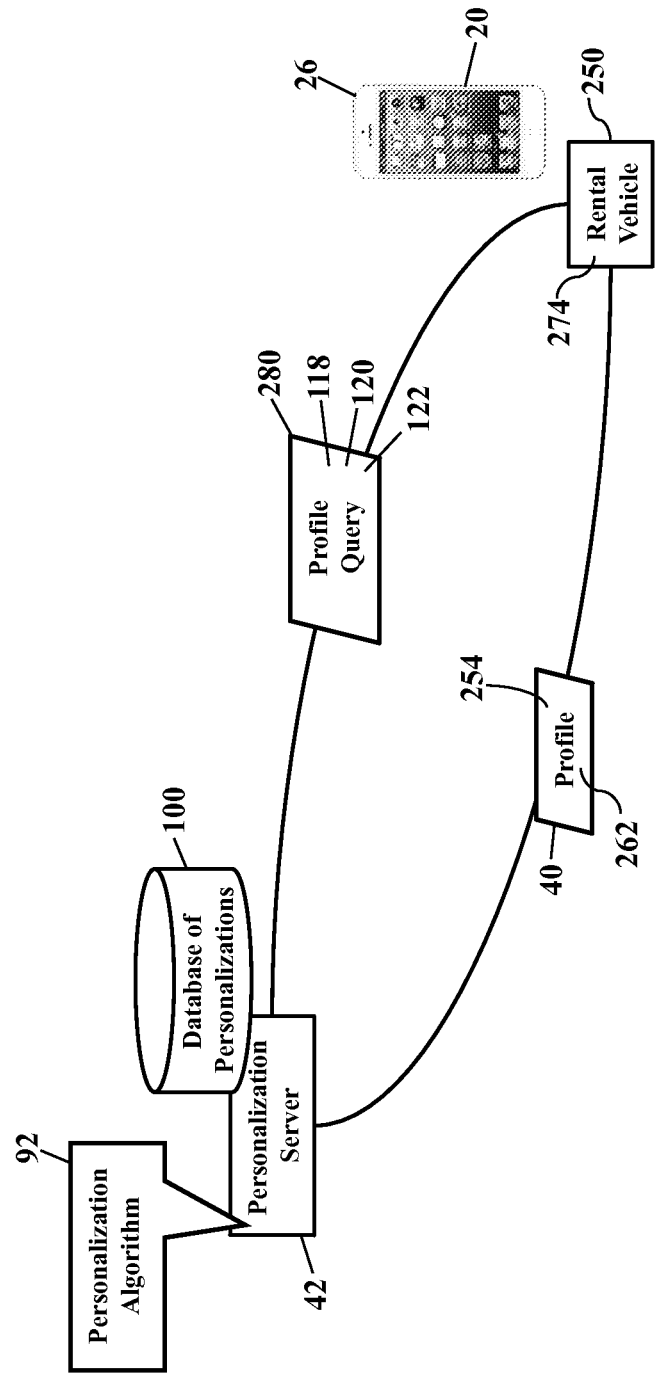

FIG. 25 illustrates direct personalization. Here the rental vehicle 250 may personalize itself to the renter's profile 40. As the reader may understand, the smartphone 26 may connect or pair with the rental vehicle 250 using a BLUETOOTH® or any other wireless connection or protocol. The rental vehicle 250 may thus have one or more transceivers for wireless communication with the smartphone 26. When the rental vehicle 250 wireless detects the renter's smartphone 26 (perhaps using a BLUETOOTH® or WI-FI® connection), the rental vehicle 250 itself may query for and retrieve the personalization profile 40. As FIG. 25 illustrates, any wireless transceiver in the rental vehicle 250 may send the profile query 280 into the communications network (not shown for simplicity). The profile query 280 routes for delivery to the network address of the personalization server 42. The profile query 280 may include the CTN 118, the IMSI 120, and/or the MSISDN 122 of the renter's smartphone 26. The personalization server 42 queries the database 100 of personalizations and retrieves the matching profile 40 (as previously explained). The personalization server 42 return sends the profile 40 into the communications network for routing and delivery to the Internet protocol address of the rental vehicle 250. When the rental vehicle 250 receives the profile 40, the rental vehicle 250 may also receive the renter's vehicular settings 254 and/or the renter's vehicular data subscription 262. Controllers in the rental vehicle 250 may thus be commanded to personalize according to the profile 40, again based on detection or presence of the user's smartphone 26.

Figure 26:
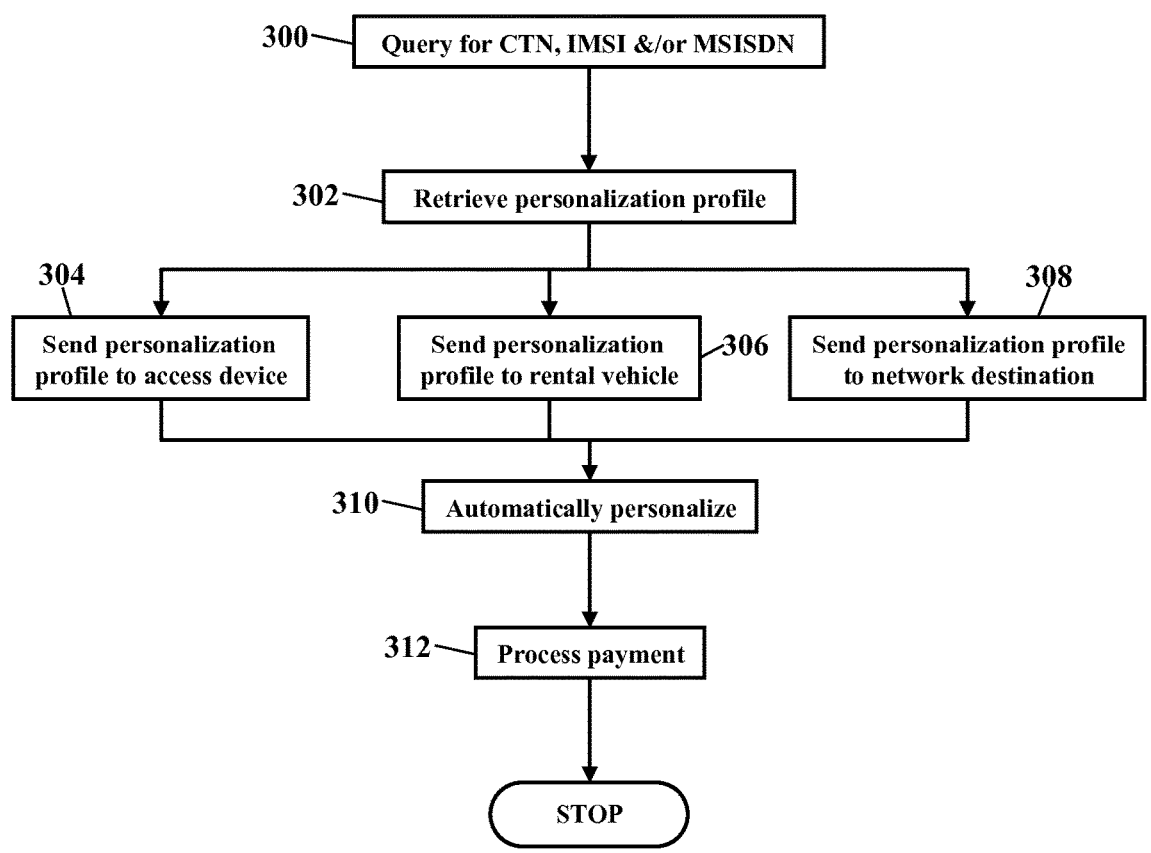
FIG. 26 is a flowchart illustrating an algorithm for personalization, according to exemplary embodiments.

FIG. 26 is a flowchart illustrating an algorithm for personalization, according to exemplary embodiments. A query is made for a cellular telephone number ("CTN") 118, the IMSI 120, and/or or the MSISDN 122 (Block 300). The corresponding personalization profile 40 is retrieved (Block 302). The personalization profile 40 may be sent to the network access device 112 (Block 304), to the rental vehicle 250 (Block 306), and/or to any network destination (Block 308). The rental property 22 and/or the rental vehicle 250 may then be personalized according to the personalization profile 40 (Block 310). A payment may be processed for the personalization (Block 312).

Personalization may thus be fee-based. Whenever exemplary embodiments personalize rental properties, fees may be charged. The personalization profile 40, for example, may further associate the CTN 118, the IMSI 120, and/or or the MSISDN 122 to a credit card number, account, or other electronic payment method. The database 100 of personalizations, then, may have one or more additional database entries for storing the user's credit card number or other electronic payment information. Whenever the user's profile 40 is retrieved for some personalization, the user's corresponding payment may also be retrieved and processed.

Figure 27:
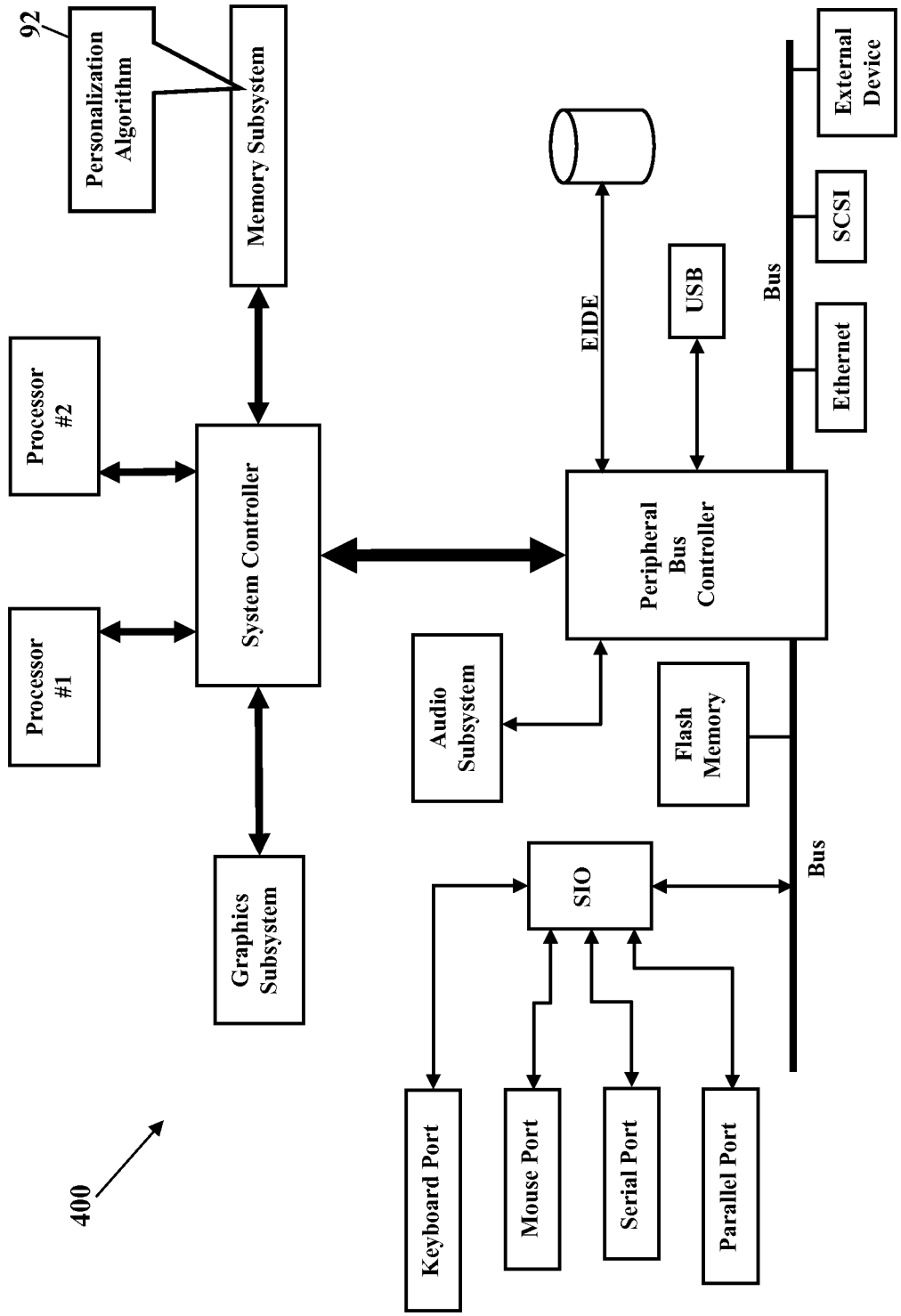
FIGS. 27-28 depict still more operating environments for additional aspects of the exemplary embodiments.

FIG. 27 is a schematic illustrating still more exemplary embodiments. FIG. 27 is a more detailed diagram illustrating a processor-controlled device 400. As earlier paragraphs explained, exemplary embodiments may partially or entirely operate in any mobile or stationary processor-controlled device. FIG. 27, then, illustrates the personalization algorithm 92 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 28:
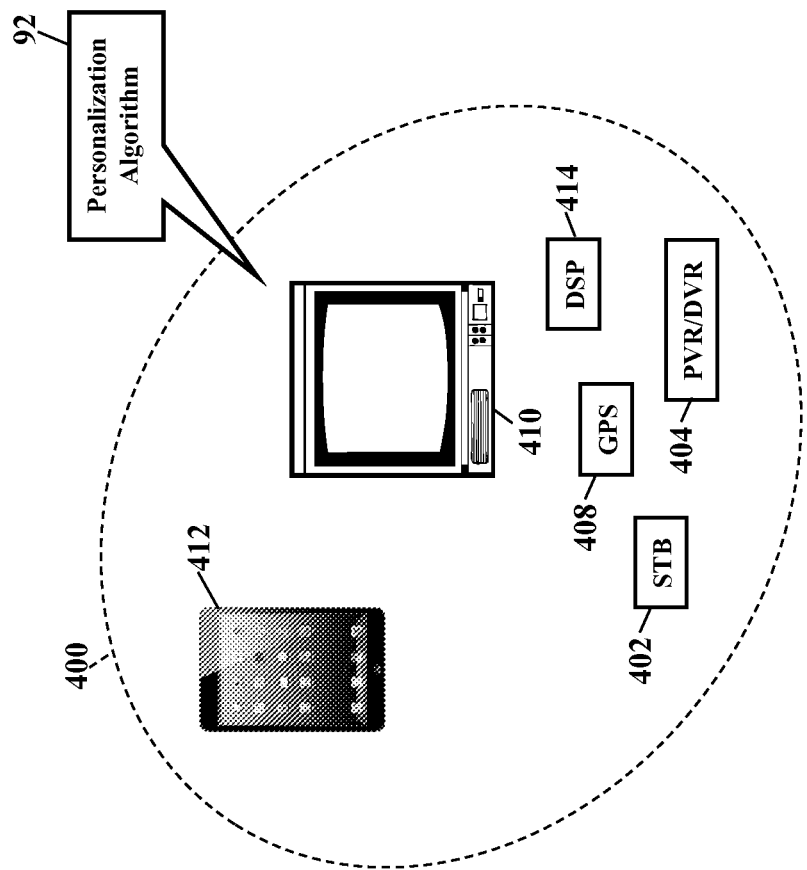

FIG. 28 depicts other possible operating environments for additional aspects of the exemplary embodiments. FIG. 28 illustrates the personalization algorithm 92 operating within various other processor-controlled devices 400. FIG. 28, for example, illustrates that the personalization algorithm 92 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for automatic personalization, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
   a hardware processor; and
   a memory device, the memory device storing instructions, the instructions when executed causing the hardware processor to perform operations, the operations comprising:
   receiving an access notification sent from a router, the access notification specifying a cellular identifier associated with a device requesting an access to a wireless network serving a rental property;
   inspecting a packet header of a packet of data contained within the access notification for a personalization bit set by the device to authorize a personalizing of the rental property;
   in response to the personalization bit having an incorrect value, declining the personalizing of the rental property;
   in response to the personalization bit having a correct value, querying a personalization database to identify a security system setting, the personalization database electronically associating security system settings to cellular identifiers including the cellular identifier specified by the access notification; and
   sending the security system setting as packets of data via the Internet to a network address associated with a security controller of a security system monitoring the rental property;
   wherein the security system setting personalizes the security system monitoring the rental property.

2. The system of claim 1, wherein the operations further comprise configuring a sensor of the security system.

3. The system of claim 1, wherein the operations further comprise retrieving a credit card number that is electronically associated with the cellular identifier.

4. The system of claim 3, wherein the operations further comprise processing the credit card number as an electronic payment for the personalizing of the rental property.

5. The system of claim 1, wherein the operations further comprise configuring a camera of the security system.

6. The system of claim 1, wherein the operations further comprise retrieving a music library that is electronically associated with the cellular identifier.

7. The system of claim 1, wherein the operations further comprise retrieving a movie library that is electronically associated with the cellular identifier.

8. A method, comprising:
   receiving an access notification sent from a wireless access device broadcasting a wireless network, the access notification describing a cellular identifier assigned to a device requesting an access to the wireless network serving a rental property;
   inspecting a packet header of a packet of data contained within the access notification for a personalization bit set by the device to authorize a personalizing of the rental property;
   in response to the personalization bit having an incorrect value, declining the personalizing of the rental property;
   in response to the personalization bit having a correct value, querying a personalization database for the cellular identifier, the personalization database electronically associating cellular identifiers to security system settings associated with security systems serving rental properties;
   retrieving the security system settings from the personalization database that are electronically associated with the cellular identifier;
   retrieving an Internet protocol address from the personalization database that is electronically associated to the cellular identifier, the Internet protocol address assigned to a security system of the security systems that monitors the rental property; and
   sending the security system settings to the Internet protocol address to personalize the security system that monitors the rental property.

9. The method of claim 8, further comprising retrieving a music library that is electronically associated with the cellular identifier.

10. The method of claim 9, further comprising sending the music library to the Internet protocol address to personalize the rental property.

11. The method of claim 8, further comprising retrieving a movie library that is electronically associated with the cellular identifier.

12. The method of claim 11, further comprising sending the movie library to the Internet protocol address to personalize the rental property.

13. The method of claim 8, further comprising retrieving a credit card number that is electronically associated with the cellular identifier.

14. The method of claim 13, further comprising processing the credit card number as an electronic payment to personalize the rental property.

15. The method of claim 8, further comprising configuring a camera of the security system according to the security system settings.

16. The method of claim 15, further comprising configuring a sensor of the security system according to the security system settings.

17. A hardware memory device storing instructions that when executed cause a hardware processor to perform operations for personalizing a rental vehicle, the operations comprising:

receiving an access notification as packets of data sent from an access device to a wireless local area network, the access notification identifying a service set identifier and a cellular identifier reported by a mobile device requesting an access to the wireless local area network;

inspecting a packet header of a packet of data contained within the access notification for a personalization bit set by the device to authorize a personalizing of the rental vehicle;

in response to the personalization bit having an incorrect value, declining the personalizing of the rental vehicle;

in response to the personalization bit having a correct value, querying an electronic database for the cellular identifier reported by the mobile device, the electronic database electronically mapping favorite radio channels to cellular identifiers including the cellular identifier reported by the mobile device;

retrieving the favorite radio channels from the electronic database that are electronically associated to the cellular identifier reported by the mobile device;

querying another database for the cellular identifier reported by the mobile device, the another database associating vehicle identification numbers to the cellular identifiers including the cellular identifier reported by the mobile device;

retrieving a vehicle identification number of the vehicle identification numbers from the another database that is electronically associated to the cellular identifier reported by the mobile device; and sending the favorite radio channels to the rental vehicle associated with the vehicle identification number.

18. The hardware memory device of claim 17, wherein the operations further comprise retrieving a credit card number that is electronically associated to the cellular identifier reported by the mobile device.

19. The hardware memory device of claim 18, wherein the operations further comprise processing the credit card number as an electronic payment for the personalizing of the rental vehicle with the favorite radio channels.

20. The hardware memory device of claim 17, wherein the operations further comprise:

retrieving a subscriber's data plan that is electronically associated by the electronic database to the cellular identifier reported by the mobile device; and transferring the subscriber's data plan retrieved from the electronic database to the rental vehicle associated with the vehicle identification number.

* * * * *